US008742339B2

(12) United States Patent
Hoyes

(10) Patent No.: US 8,742,339 B2
(45) Date of Patent: Jun. 3, 2014

(54) MASS SPECTROMETER

(71) Applicant: Micromass UK Limited, Manchester (GB)

(72) Inventor: John Brian Hoyes, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 13/784,130

(22) Filed: Mar. 4, 2013

(65) Prior Publication Data

US 2013/0175439 A1 Jul. 11, 2013

Related U.S. Application Data

(63) Continuation of application No. 13/157,021, filed on Jun. 9, 2011, now Pat. No. 8,389,933, which is a continuation of application No. 12/373,204, filed as application No. PCT/GB2007/002561 on Jul. 9, 2007, now Pat. No. 7,960,694, which is a continuation-in-part of application No. 11/483,961, filed on Jul. 10, 2006, now Pat. No. 7,405,401, which is a continuation-in-part of application No. PCT/GB2005/000050, filed on Jan. 10, 2005, said application No. PCT/GB2007/002561 is a continuation-in-part of application No. PCT/GB2006/002728, filed on Jul. 21, 2006.

(60) Provisional application No. 60/913,897, filed on Apr. 25, 2007, provisional application No. 60/701,466, filed on Jul. 21, 2005.

(30) Foreign Application Priority Data

| | | |
|---|---|---|
| Jan. 9, 2004 | (GB) | 0400420 |
| Apr. 17, 2005 | (GB) | 0408628 |
| Jul. 21, 2005 | (GB) | 0514964 |
| Mar. 14, 2007 | (GB) | 0704923.2 |

(51) Int. Cl.
*H01J 49/00* (2006.01)
*B01D 59/44* (2006.01)

(52) U.S. Cl.
USPC .......... 250/290; 250/281; 250/282; 250/283; 250/292

(58) Field of Classification Search
USPC .......................... 250/281, 282, 283, 290, 292
See application file for complete search history.

(56) References Cited

U.S. PATENT DOCUMENTS 5,206,506 A 4/1993 Kirchner
6,177,668 B1 1/2001 Hager (Continued)

OTHER PUBLICATIONS

Tolmachev et al., Rapid Communications in Mass Spectrometry, vol. 14, No. 20, pp. 1907-1913, XP 002370070.

*Primary Examiner* — David A Vanore
(74) *Attorney, Agent, or Firm* — Diederiks & Whitelaw, PLC

(57) ABSTRACT

A mass analyzer is provided comprising a plurality of electrodes having apertures through which ions are transmitted. A plurality of pseudo-potential corrugations are created along the axis of the mass analyzer. The amplitude or depth of the pseudo-potential corrugations is inversely proportional to the mass to charge ratio of an ion. Transient DC voltages are applied to the electrodes in order to urge ions along the length of the mass analyzer. The amplitude of the transient DC voltages applied to the electrodes is increased with time and ions are caused to be emitted from the mass analyzer in reverse order of their mass to charge ratio. Two AC or RF voltages are applied to the electrodes. The first AC or RF voltage is arranged to provide optimal pseudo-potential corrugations while the second AC or RF voltage is arranged to provide optimal radial confinement of ions within the mass analyzer.

17 Claims, 6 Drawing Sheets

(56) References Cited

U.S. PATENT DOCUMENTS

| | | | |
|---|---|---|---|
| 6,525,312 | B1 | 2/2003 | Cousins |
| 6,707,032 | B2 | 3/2004 | Speakman et al. |
| 6,744,043 | B2 | 6/2004 | Loboda |
| 6,770,871 | B1 | 8/2004 | Wang et al. |
| 6,781,116 | B2 | 8/2004 | Bateman |
| 6,791,078 | B2 | 9/2004 | Giles et al. |
| 6,794,641 | B2 | 9/2004 | Bateman et al. |
| 6,794,642 | B2 | 9/2004 | Bateman et al. |
| 6,800,846 | B2 | 10/2004 | Bateman et al. |
| 6,812,453 | B2 | 11/2004 | Bateman et al. |
| 6,835,928 | B2 | 12/2004 | Bateman |
| 6,838,662 | B2 | 1/2005 | Bateman et al. |
| 6,875,980 | B2 | 4/2005 | Bateman et al. |
| 6,884,995 | B2 | 4/2005 | Bateman et al. |
| 6,891,157 | B2 | 5/2005 | Bateman et al. |
| 6,906,319 | B2 | 6/2005 | Hoyes |
| 6,914,241 | B2 | 7/2005 | Giles et al. |
| 6,956,205 | B2 | 10/2005 | Park |
| 6,977,371 | B2 | 12/2005 | Bateman et al. |
| 6,992,283 | B2 | 1/2006 | Bateman et al. |
| 7,045,797 | B2 | 5/2006 | Sudakov et al. |
| 7,049,583 | B2 | 5/2006 | Bateman et al. |
| 7,071,467 | B2 | 7/2006 | Bateman et al. |
| 7,087,897 | B2 | 8/2006 | Bateman et al. |
| 7,095,013 | B2 | 8/2006 | Bateman et al. |
| 7,095,014 | B2 | 8/2006 | Hoyes |
| 7,102,126 | B2 | 9/2006 | Bateman et al. |
| 7,145,139 | B2 | 12/2006 | Syka |
| 7,205,538 | B2 | 4/2007 | Bateman et al. |
| 7,309,861 | B2 | 12/2007 | Brown et al. |
| 7,365,319 | B2 | 4/2008 | Hager et al. |
| 7,405,401 | B2 | 7/2008 | Hoyes |
| 7,586,088 | B2 | 9/2009 | Bateman et al. |
| 7,622,711 | B2 | 11/2009 | Wildgoose et al. |
| 7,642,511 | B2 | 1/2010 | Reilly |
| 7,829,841 | B2 | 11/2010 | Bateman et al. |
| 7,829,849 | B2 | 11/2010 | Giles |
| 7,858,926 | B1 | 12/2010 | Whitehouse et al. |
| 7,919,747 | B2 | 4/2011 | Green et al. |
| 7,960,694 | B2 | 6/2011 | Hoyes |
| 8,153,960 | B2 | 4/2012 | Giles et al. |
| 8,389,933 | B2 * | 3/2013 | Hoyes .......................... 250/282 |
| 2004/0046124 | A1 | 3/2004 | Derrick |
| 2005/0253064 | A1 | 11/2005 | Loboda |
| 2007/0034810 | A1 | 2/2007 | Hoyes |
| 2009/0072136 | A1 | 3/2009 | Pringle et al. |
| 2009/0134321 | A1 | 5/2009 | Hoyes |
| 2009/0194688 | A1 | 8/2009 | Bateman et al. |
| 2010/0065737 | A1 | 3/2010 | Bateman et al. |
| 2010/0108878 | A1 | 5/2010 | Bateman et al. |
| 2010/0252730 | A1 | 10/2010 | Green et al. |
| 2010/0294923 | A1 | 11/2010 | Kenny et al. |
| 2010/0301206 | A1 | 12/2010 | Brown et al. |
| 2010/0327157 | A1 | 12/2010 | Green et al. |
| 2011/0233396 | A1 | 9/2011 | Hoyes |

* cited by examiner

MASS SPECTROMETER

CROSS REFERENCE TO RELATED APPLICATIONS

This application is a continuation of U.S. patent application Ser. No. 13/157,021 filed Jun. 9, 2011, which is a continuation of U.S. patent application Ser. No. 12/373,204 which was filed on Jul. 9, 2007, now U.S. Pat. No. 7,960,694 which issued on Jun. 14, 2011, which is the National Stage of International Application No. PCT/GB2007/002561, filed Jul. 9, 2007, which a) claims benefit of and priority to U.S. Provisional Patent Application No. 60/913,897, filed on Apr. 25, 2007 and United Kingdom Priority Application No. 0704923.2, filed Mar. 14, 2007, b) is a continuation in part of U.S. patent application Ser. No. 11/483,961 filed on Jul. 10, 2006, now U.S. Pat. No. 7,405,401 which issued on Jul. 29, 2008, which is a continuation in part of application No. PCT/GB2005/000050, filed on Jan. 10, 2005 and claims benefit of and priority to U.S. provisional application No. 60/701,466, filed on Jul. 21, 2005 and c) is a continuation in part of application No. PCT/GB2006/002728, filed on Jul. 21, 2006. The contents of these applications are expressly incorporated herein by reference in their entirety.

BACKGROUND OF THE INVENTION

The present invention relates to a mass analyser and a method of mass analysing ions.

It is often necessary to transfer ions from an ionisation region of a mass spectrometer which may be maintained at a relatively high pressure to a mass analyser which is maintained at a relatively low pressure. It is known to use one or more Radio Frequency (RF) ion guides to transport ions from the ionisation region to the mass analyser. It is known to operate the RF ion guides at intermediate pressures of about $10^{-3}$-1 mbar.

It is also known that the time averaged force on a charged particle or ion in the presence of an inhomogeneous AC or RF electric field is such as to accelerate the charged particle or ion to a region where the electric field is weaker. A minimum in the electric field is commonly referred to as a pseudo-potential valley or well. Known RF ion guides exploit this phenomenon by arranging for a pseudo-potential valley or well to be generated or created along the central axis of the RF ion guide so that ions are radially confined centrally within the RF ion guide.

Known RF ion guides are used as a means of efficiently confining and transporting ions from one region to another. The potential profile along the central axis of known RF ion guides is substantially constant and as a result known RF ion guides transport all ions with minimum delay and without discrimination between ions of different species.

It is desired to provide an improved mass analyser.

SUMMARY OF THE INVENTION

According to an aspect of the present invention there is provided a mass analyser comprising:

an ion guide comprising a plurality of electrodes;

means for applying a first AC or RF voltage having a first frequency and a first amplitude to at least some of the plurality of electrodes such that, in use, one or more axial time averaged or pseudo-potential barriers, corrugations or wells are created along at least a portion of the axial length of the ion guide;

means for applying a second AC or RF voltage having a second frequency and a second amplitude to one or more of the plurality of electrodes in order to confine ions radially in use within the ion guide; and means for driving or urging ions along and/or through at least a portion of the axial length of the ion guide so that in a mode of operation ions having mass to charge ratios within a first range exit the ion guide whilst ions having mass to charge ratios within a second different range are axially trapped or confined within the ion guide by the plurality of axial time averaged or pseudo-potential barriers, corrugations or wells.

It should be understood that a mass analyser relates to a device which separates ions according to their mass to charge ratio and not some other property such as ion mobility or rate of change of ion mobility with electric field strength.

The first frequency may be substantially different from the second frequency. Alternatively, the first frequency may be substantially the same as the second frequency.

The first frequency is preferably selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz. The second frequency is preferably selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The first amplitude may be substantially different from the second amplitude. Alternatively, the first amplitude may be substantially the same as the second amplitude.

The first amplitude is preferably selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. The second amplitude is preferably selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The phase difference between the first AC or RF voltage and the second AC or RF voltage is preferably selected from the group consisting of: (i) 0-10°; (ii) 10-20°; (iii) 20-30°; (iv) 30-40°; (v) 40-50°; (vi) 50-60°; (vii) 60-70°; (viii) 70-80°; (ix) 80-90°; (x) 90-100°; (xi) 100-110°; (xii) 110-120°; (xiii) 120-130°; (xiv) 130-140°; (xv) 140-150°; (xvi) 150-160° (xvii) 160-170°; (xviii) 170-180°; (xix) 180-190°; (xx) 190-200°; (xxi) 200-210°; (xxii) 210-220°; (xxiii) 220-230°; (xxiv) 230-240°; (xxv) 240-250°; (xxvi) 250-260°; (xxvii) 260-270°; (xxviii) 270-280°; (xxix) 280-290°; (xxx) 290-300°; (xxxi) 300-310°; (xxxii) 310-320°; (xxxiii) 320-330°; (xxxiv) 330-340°; (xxxv) 340-350°; and (xxxvi) 350-360°.

The phase difference between the first AC or RF voltage and the second AC or RF voltage may be selected from the group consisting of: (i) 0°; (ii) 90°; (iii) 180'; and (iv) 270°.

The ion guide preferably comprises a plurality of first groups of electrodes, wherein each first group of electrodes comprises at least 1, 2, 3, 4, 5, 6, 7, 8, 9, 10, 11, 12, 13, 14, 15, 16, 17, 18, 19 or 20 electrodes or a plurality of electrodes. The ion guide preferably comprises m first groups of electrodes, wherein m is selected from the group consisting of; (i) 1-10; (ii) 11-20; (iii) 21-30; (iv) 31-40; (v) 41-50; (vi) 51-60; (vii) 61-70; (viii) 71-80; (ix) 81-90; (x) 91-100; and (xi) >100. According to the preferred embodiment at least 1, 2, 3, 4, 5, 6, 7, 8, 9, 10, 11, 12, 13, 14, 15, 16, 17, 18, 19 or 20 electrodes or a plurality of electrodes in one or more or each first group of electrodes are supplied with the same phase of the first AC or RF voltage.

The axial length of at least 1%, 5%, 10%, 20%, 30%, 40%, 50%, 60%, 70%, 80%, 90%, 95% or 100% of the first group of electrodes is preferably selected from the group consisting of: (i) <1 mm; (ii) 1-2 mm; (iii) 2-3 mm; (iv) 3-4 mm; (v) 4-mm; (vi) 5-6 mm; (vii) 6-7 mm; (viii) 7-8 mm; (ix) 8-9 mm; (x) 9-10 mm; (xi) 10-11 mm; (xii) 11-12 mm; (xiii) 12-13 mm; (xiv) 13-14 mm; (xv) 14-15 mm; (xvi) 15-16 rue; (xvii) 16-17 mm; (xviii) 17-18 mm; (xix) 18-9 mm; (xx) 19-20 mm; and (xxi) >20 mm.

The axial spacing between at least 1%, 5%, 10%, 20%, 30%, 40%, 50%, 60%, 70%, 80%, 90%, 95% or 100% of the first group of electrodes is preferably selected from the group consisting of: (i) <1 mm; (ii) 1-2 mm; (iii) 2-3 mm; (iv) 3-4 mm; (v) 4-ran; (vi) 5-6 mm; (vii) 6-7 mm; (viii) 7-8 mm; (ix) 8-9 mm; (x) 9-10 mm; (xi) 10-11 mm; (xii) 11-12 mm; (xiii) 12-13 mm; (xiv) 13-14 nm; (xv) 1.4-15 mm; (xvi) 15-16 mm; (xvii) 6-17 mm; (xviii) 17-18 mm; (xix) 18-19 mm; (xx) 19-20 mm; and (xxi) >20 mm.

According to an embodiment a regular periodic array of axial pseudo-potential barriers, corrugations or wells is preferably formed which preferably has the same periodicity as the axial spacing between electrodes forming the ion guide. However, more preferred embodiments are also contemplated wherein the axial pseudo-potential barriers, corrugations or wells may have a different periodicity.

The one or more axial time averaged or pseudo-potential barriers, corrugations or wells preferably have a minima along the axial length of the ion guide which preferably correspond with the middle or centre of the first groups of electrodes.

The one or more axial time averaged or pseudo-potential barriers, corrugations or wells preferably have maxima along the axial length of the ion guide located at axial locations which preferably correspond with substantially 50% of the axial distance or separation between first groups of electrodes.

The one or more axial time averaged or pseudo-potential barriers, corrugations or wells preferably have minima and/or maxima which are substantially the same height, depth or amplitude for ions having a particular mass to charge ratio. The minima and/or maxima preferably have a periodicity which is substantially the same as the axial arrangement or periodicity of the first groups of electrodes.

According to the preferred embodiment the ion guide preferably comprises a plurality of second groups of electrodes, wherein each second group of electrodes comprises at least 1, 2, 3, 4, 5, 6, 7, 8, 9, 10, 11, 12, 13, 14, 15, 16, 17, 18, 19 or 20 electrodes or a plurality of electrodes. The ion guide preferably comprises n second groups of electrodes, wherein n is selected from the group consisting of: (i) 1-10; (ii) 11-20; (iii) 21-30; (iv) 31-40; (v) 41-50; (vi) 51-60; (vii) 61-70; (viii) 71-80; (ix) 81-90; (x) 91-100; and (xi) >100.

At least 1, 2, 3, 4, 5, 6, 7, 8, 9, 10, 11, 12, 13, 14, 15, 16, 17, 18, 19 or 20 electrodes or a plurality of electrodes in one or more or each second group of electrodes are preferably supplied with the same phase of the second AC or RF voltage.

The axial length of at least 1%, 5%, 10%, 20%, 30%, 40%, 50%, 60%, 70%, 80%, 90%, 95% or 100% of the second group of electrodes is preferably selected from the group consisting of: (i) <1 mm; (ii) 1-2 mm; (iii) 2-3 mm; (iv) 3-4 mm; (v) 4-mm; (vi) 5-6 mm; (vii) 6-7 mm; (viii) 7-8 mm; (ix) 8-9 mm; (x) 9-10 mm; (xi) 10-11 mm; (xii) 11-12 mm; (xiii) 12-13 mm; (xiv) 13-14 mm; (xv) 14-15 mm; (xvi) 15-16 mm; (xvii) 16-17 mm; (xviii) 17-18 mm; (xix) 18-19 mm; (xx) 19-20 mm; and (xxi) >20 mm.

The axial spacing between at least 1%, 5%, 10%, 20%, 30%, 40%, 50%, 60%, 70%, 80%, 90%, 95% or 100% of the second group of electrodes is preferably selected from the group consisting of: (i) <1 mm; (ii) 1-2 mm; (iii) 2-3 mm; (iv) 3-4 mm; (v) 4-mm; (vi) 5-6 mm; (vii) 6-7 mm; (viii) 7-8 mm; (ix) 8-9 mm; (x) 9-10 mm; (xi) 10-11 mm; (xii) 11-12 mm; (xiii) 12-13 mm; (xiv) 13-14 mm; (xv) 14-15 mm; (xvi) 15-16 nm; (xvii) 16-17 mm; (xviii) 17-18 mm; (xix) 18-19 mm; (xx) 19-20 mm; and (xxi) >20 mm.

According to the preferred embodiment axially adjacent electrodes are supplied with opposite phases of the second AC or RF voltage.

The one or more axial time averaged or pseudo-potential barriers, corrugations or wells preferably have a minima along the axial length of the ion guide which preferably correspond with the middle or centre of the second groups of electrodes.

The one or more axial time averaged or pseudo-potential barriers, corrugations or wells preferably have maxima along the axial length of the ion guide located at axial locations which preferably correspond with substantially 50% of the axial distance or separation between second groups of electrodes.

The one or more axial time averaged or pseudo-potential barriers, corrugations or wells preferably have minima and/or maxima which are substantially the same height, depth or amplitude for ions having a particular mass to charge ratio. The minima and/or maxima preferably have a periodicity which is substantially the same as the axial arrangement or periodicity of the second groups of electrodes.

According to the preferred embodiment the first range is preferably selected from the group consisting of: (i) <100; (ii) 100-200; (iii) 200-300; (iv) 300-400; (v) 400-500; (vi) 500-600; (vii) 600-700; (viii) 700-800; (ix) 800-900; (x) 900-1000; and (xi) >1000. The second range is preferably selected from the group consisting of: (i) <100; (ii) 100-200; (iii) 200-300; (iv) 300-400; (v) 400-500; (vi) 500-600; (vii) 600-700; (viii) 700-800; (ix) 800-900; (x) 900-1000; and (xi) >1000.

The means for applying the first AC or RF voltage to at least some of the plurality of electrodes is preferably arranged and adapted to cause one or more axial time averaged or pseudo-potential barriers, corrugations or wells to be created along at least 1%, 5%, 10%, 20%, 30%, 40%, 50%, 60%, 70%, 80%, 90%, 95% or 100% of the axial length of the ion guide.

The one or more axial time averaged or pseudo-potential barriers, corrugations or wells are preferably created or provided along at least 1%, 5%, 10%, 20%, 30%, 40%, 50%, 60%, 70%, 80%, 90%, 95% or 100% of the central longitudinal axis of the ion guide.

The one or more axial time averaged or pseudo-potential barriers, corrugations or wells preferably extend at least r minima radial direction away from the central longitudinal axis of the ion guide, wherein r is selected from the group consisting of: (i) <1; (ii) 1-2; (iii) 2-3; (iv) 3-4; (v) 4-5; (vi) 5-6; (vii) 6-7; (viii) 7-8; (ix) 8-9; (x) 9-10; and (xi) >10.

For ions having mass to charge ratios falling within a range 1-100, 100-200, 200-300, 300-400, 400-500, 500-600, 600-700, 700-800, 800-900 or 900-1000 the amplitude, height or depth of at least 1%, 5%, 10%, 20%, 30%, 40%, 50%, 60%, 70%, 80%, 90%, 95% or 100% of the axial time averaged or pseudo-potential barriers, corrugations or wells is preferably selected from the group consisting of: (i) <0.1V; (ii) 0.1-0.2 V; (iii) 0.2-0.3 V; (iv) 0.3-0.4 V; (v) 0.4-0.5 V; (vi) 0.5-0.6 V; (vii) 0.6-0.7 V; (viii) 0.7-0.8 V; (ix) 0.8-0.9 V; (x) 0.9-1.0 V; (xi) 1.0-1.5 V; (xii) 1.5-2.0 V; (xiii) 2.0-2.5 V; (xiv) 2.5-3.0 V; (xv) 3.0-3.5 V; (xvi) 3.5-4.0 V; (xvii) 4.0-4.5 V; (xviii) 4.5-5.0 V; (xix) 5.0-5.5 V; (xx) 5.5-6.0 V; (xxi) 6.0-6.5 V; (xxii) 6.5-7.0 V; (xxiii) 7.0-7.5 V; (xxiv) 7.5-8.0 V; (xxv) 8.0-8.5 V; (xxvi) 8.5-9.0 V; (xxvii) 9.0-9.5 V; (xxviii) 9.5-1.0.0 V; and (xxix) >10.0 V.

At least 1, 2, 3, 4, 5, 6, 7, 8, 9 or 10 axial time averaged or pseudo-potential barriers, corrugations or wells are preferably provided or created, in use, per cm along the axial length of the ion guide.

According to the preferred embodiment the plurality of electrodes comprises a plurality of electrodes having apertures through which ions are transmitted in use. Preferably, at least 1%, 5%, 10%, 20%, 30%, 40%, 50%, 60%, 70%, 80%, 90%, 95% or 100% of the electrodes have substantially circular, rectangular, square or elliptical apertures. Preferably, at least 1%, 5%, 10%, 20%, 30%, 40%, 50%, 60%, 70%, 80%, 90%, 95% or 100% of the electrodes have apertures which are substantially the same size or which have substantially the same area. According to another embodiment at least 1%, 5%, 10%, 20%, 30%, 40%, 50%, 60%, 70%, 80%, 90%, 95% or 100% of the electrodes have apertures which become progressively larger and/or smaller in size or in area in a direction along the axis of the ion guide.

According to an embodiment at least 1%, 5%, 10%, 20%, 30%, 40%, 50%, 60%, 70%, 80%, 90%, 95% or 100% of the electrodes have apertures having internal diameters or dimensions selected from the group consisting of: (i) ≤1.0 mm; (ii) ≤2.0 mm; (iii) ≤3.0 mm; (iv) ≤4.0 mm; (v) ≤5.0 mm; (vi) ≤6.0 mm; (vii) ≤7.0 mm; (viii) ≤8.0 mm; (ix) ≤9.0 mm; (x) ≤10.0 mm; and (xi) >10.0 mm. Preferably, at least 1%, 5%, 10%, 20%, 30%, 40%, 50%, 60%, 70%, 80%, 90%, 95% or 100% of the electrodes are spaced apart from one another by an axial distance selected from the group consisting of: (i) less than or equal to 5 mm; (ii) less than or equal to 4.5 mm; (ii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 nm; (xii) less than or equal to 0.4 mm; (xiii) less than or equal to 0.2 mm; (xiv) less than or equal to 0.1 mm; and (xv) less than or equal to 0.25 mm.

According to the preferred embodiment at least some of the plurality of electrodes comprise apertures and wherein the ratio of the internal diameter or dimension of the apertures to the centre-to-centre axial spacing between adjacent electrodes is selected from the group consisting of: (i) <(vi) 1.8-2.0; (vii) 2.0-2.2; (viii) 2.2-2.4; (ix) 2.4-2.6; (x) 2.6-2.8; (xi) 2.8-3.0; (xii) 3.0-3.2; (xiii) 3.2-3.4; (xiv) 3.4-3.6; (x) 3.6-3.8; (xvi) 3.8-4.0; (xvii) 4.0-4.2; (xviii) 4.2-4.4; (xix) 4.4-4.6; (xx) 4.6-4.8; (xxi) 4.8-5.0; and (xxii) >5.0.

At least 1%, 5%, 10%, 20%, 30%, 40%, 50%, 60%, 70%, 80%, 90%, 95% or 100% of the electrodes preferably have a thickness or axial length selected from the group consisting of: (1) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; xiii less than or equal to 0.2 mm; (xiv) less than or equal to 0.1 en; and (xv) less than or equal to 0.25 mm.

According to another embodiment the ion guide may comprise a segmented rod set ion guide. The ion guide may comprise, for example, a segmented quadrupole, hexapole or octapole ion guide or an ion guide comprising more than eight segmented rod sets. The ion guide may comprise a plurality of electrodes having a cross-section selected from the group consisting of: (i) approximately or substantially circular cross-section; (ii) approximately or substantially hyperbolic surface; (iii) an arcuate or part-circular cross-section; (iv) an approximately or substantially rectangular cross-section; and (v) an approximately or substantially square cross-section.

According to another embodiment the ion guide may comprise a plurality of groups of electrodes, wherein the groups of electrodes are axially spaced along the axial length of the ion guide and wherein each group of electrodes comprises a plurality of plate electrodes. Each group of electrodes preferably comprises a first plate electrode and a second plate electrode, wherein the first and second plate electrodes are arranged substantially in the sane plane and are arranged either side of the central longitudinal axis of the ion guide.

According to this embodiment means for applying a DC voltage or potential to the first and second plate electrodes in order to confine ions in a first radial direction within the ion guide is preferably provided.

Each group of electrodes preferably further comprises a third plate electrode and a fourth plate electrode, wherein the third and fourth plate electrodes are preferably arranged substantially in the same plane as the first and second plate electrodes and are arranged either side of the central longitudinal axis of the ion guide in a different orientation to the first and second plate electrodes.

The means for applying a second AC or RF voltage is preferably arranged to apply the second AC or RF voltage to the third and fourth plate electrodes in order to confine ions in a second radial direction within the ion guide which is preferably orthogonal to the first radial direction.

The means for applying the first AC or RF voltage is preferably arranged to apply the first AC or RF voltage to at least 10%, 20%, 30%, 40%, 50%, 60%, 70%, 80%, 90%, 95% or 100% of the plurality of electrodes.

The means for applying the second AC or RF voltage is preferably arranged to apply the second AC or RF voltage to at least 10%, 20%, 30%, 40%, 50%, 60%, 70%, 80%, 90%, 95% or 100% of the plurality of electrodes.

The ion guide preferably has a length selected from the group consisting of: (i) <20 mm; (ii) 20-40 mm; (iii) 40-60 mm; (iv) 60-80 mm; (v) 80-100 mm; (vi) 100-1.20 mm; (vii) 120-140 mm; (viii) 140-160 mm; (ix) 160-180 mm; (x) 180-200 mm; and (xi) >200 mm.

According to the preferred embodiment the ion guide comprises at least: (i) 10-20 electrodes; (ii) 20-30 electrodes; (iii) 30-40 electrodes; (iv) 40-50 electrodes; (v) 50-60 electrodes; (vi) 60-70 electrodes; (vii) 70-80 electrodes; (viii) 80-90 electrodes; (ix) 90-100 electrodes; (x) 100-110 electrodes; (xi) 110-120 electrodes; (xii) 120-130 electrodes; (xiii) 130-140 electrodes; (xiv) 140-150 electrodes; or (xv) >150 electrodes.

According to an embodiment the means for driving or urging ions comprises means for generating a linear axial DC electric field along at least 1%, 5%, 10%, 20%, 30%, 40%, 50%, 60%, 70%, 80%, 90%, 95% or 100% of the ion guide.

According to an embodiment the means for driving or urging ions comprises means for generating a non-linear or stepped axial DC electric field along at least 1%, 5%, 10%, 20%, 30%, 40%, 50%, 60%, 70%, 80%, 90%, 95% or 100% of the ion guide.

The mass analyser preferably further comprises means arranged and adapted to progressively increase, progressively decrease, progressively vary, scan, linearly increase, linearly decrease, increase in a stepped, progressive or other manner or decrease in a stepped, progressive or other manner the axial DC electric field.

According to an embodiment the means for driving or urging ions preferably comprises means for applying a multiphase AC or RF voltage to at least 1%, 5%, 10%, 20%, 30%, 40%, 50%, 60%, 70%, 80%, 90%, 95% or 100% of the electrodes.

According to an embodiment the means for driving or urging ions comprises gas flow means which is arranged in use to drive or urge ion along and/or through at least a portion of the axial length of the ion guide by gas flow or differential pressure effects.

According to the preferred embodiment the means for driving or urging ions comprises means for applying one or more transient DC voltages or potentials or one or more DC voltage or potential waveforms to at least 1%, 5%, 10%, 20%, 30%, 40%, 50%, 60%, 70%, 80%, 90%, 95% or 100% of the electrodes. The one or more transient DC voltages or potentials or one or more DC voltage or potential waveforms preferably create one or more potential hills, barriers or wells. The one or more transient DC voltage or potential waveforms preferably comprise a repeating waveform or square wave.

A plurality of axial DC potential hills, barriers or wells are preferably translated along the length of the ion guide or a plurality of transient DC potentials or voltages are preferably progressively applied to electrodes along the axial length of the ion guide.

The mass analyser preferably further comprises first means arranged and adapted to progressively increase, progressively decrease, progressively vary, scan, linearly increase, linearly decrease, increase in a stepped, progressive or other manner or decrease in a stepped, progressive or other manner the amplitude, height or depth of the one or more transient DC voltages or potentials or the one or more DC voltage or potential waveforms.

The first means is preferably arranged and adapted to progressively increase, progressively decrease, progressively vary, scan, linearly increase, linearly decrease, increase in a stepped, progressive or other manner or decrease in a stepped, progressive or other manner the amplitude, height or depth of the one or more transient DC voltages or potentials or the one or more DC voltage or potential waveforms by $x_1$ Volts over a time period $t_1$. Preferably, $x_1$ is selected from the group consisting of: (i) <0.1V; (ii) 0.1-0.2 V; (iii) 0.2-0.3 V; (iv) 0.3-0.4 V; (v) 0.4-0.5 V; (vi) 5-0.6 V; (vii) 0.6-0.7 V; (viii) 0.7-0.8 V; (ix) 0.8-0.9 V; (x) 0.9-1.0 V; (xi) 1.0-1.5 V; (xii) 1.5-2.0 V; (xiii) 2.0-2.5 V; (xiv) 2.5-3.0 V; (xv) 3.0-3.5 V; (xvi) 3.5-4.0 V; (xvii) 4.0-4.5 V; (xviii) 4.5-5.0 V; (xix) 5.0-5.5 V; (xx) 5.5-6.0 V; (xxi) 6.0-6.5 V; (xxii) 6.5-7.0 V; (xxiii) 7.0-7.5 V; (xxiv) 7.5-8.0 V; (xxv) 8.0-8.5 V; (xxvi) 8.5-9.0 V; (xxvii) 9.0-9.5 V; (xxvii) 9.5-10.0 V; and (xxix) >10.0 V. Preferably, $t_1$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (vi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The mass analyser preferably further comprises second means arranged and adapted to progressively increase, progressively decrease, progressively vary, scan, linearly increase, linearly decrease, increase in a stepped, progressive or other manner or decrease in a stepped, progressive or other manner the velocity or rate at which the one or more transient DC voltages or potentials or the one or more DC potential or voltage waveforms are applied to the electrodes.

The second means is preferably arranged and adapted to progressively increase, progressively decrease, progressively vary, scan, linearly increase, linearly decrease, increase in a stepped, progressive or other manner or decrease in a stepped, progressive or other manner the velocity or rate at which the one or more transient DC voltages or potentials or the one or more DC voltage or potential waveforms are applied to the electrodes by $x_2$ m/s over a time period $t_2$. Preferably, $x_2$ is selected from the group consisting of: (i) <1; (ii) 1-2; (iii) 2-3; (iv) 3-4; (v) 4-5; (vi) 5-6; (vii) 6-7; (viii) 7-8; (ix) 8-9; (x) 9-10; (xi) 10-11; (xii) 11-12; (xiii) 12-13; (xiv) 13-14; (xv) 14-15; (xvi) 15-16; (xvii) 16-17; (xviii) 17-18; (xix) 18-19; (xx) 19-20; (xxi) 20-30; (xxii) 30-40; (xxiii) 40-50; (xxiv) 50-50; (xxv) 60-70; (xxvi) 70-80; (xxvii) 80-90; (xxviii) 90-100; (xxix) 100-150; (xxx) 150-200; (xxxi) 200-250; (xxxii) 250-300; (xxxiii) 300-350; (xxxiv) 350-400; (xxxv) 400-450; (xxxvi) 450-500; and (xxxvii) >500. Preferably, $t_2$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 as; (xv) 400-500 ms; (xvi) 500-600 ms; (vii) 600-700 is; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The mass analyser preferably comprises third means arranged and adapted to progressively increase, progressively decrease, progressively vary, scan, linearly increase, linearly decrease, increase in a stepped, progressive or other manner or decrease in a stepped, progressive or other manner the amplitude of the first AC or RF voltage applied to the electrodes.

The third means is preferably arranged and adapted to progressively increase, progressively decrease, progressively vary, scan, linearly increase, linearly decrease, increase in a stepped, progressive or other manner or decrease in a stepped, progressive or other manner the amplitude of the first AC or RF voltage by $x_3$ Volts over a time period $t_3$. Preferably, $x_3$ is selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. Preferably, $t_3$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The mass analyser preferably comprises fourth means arranged and adapted to progressively increase, progressively decrease, progressively vary, scan, linearly increase, linearly decrease, increase in a stepped, progressive or other manner or decrease in a stepped, progressive or other manner the frequency of the first RF or AC voltage applied to the electrodes.

The fourth means is preferably arranged and adapted to progressively increase, progressively decrease, progressively vary, scan, linearly increase, linearly decrease, increase in a stepped, progressive or other manner or decrease in a stepped, progressive or other manner the frequency of the first RF or AC voltage applied to the electrodes by $x_4$ MHz over a time period $t_4$. Preferably, $x_4$ is selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz. Preferably, $t_4$ is selected from the group consisting of: (i) <1 ms; (ii) 1-10 ms; (iii) 10-20 ms; (iv) 20-30 ms; (v) 30-40 ins; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; xxiii) 3-4 s; (xxiv) 4-5 s; and (xxv) >5 s.

The mass analyser preferably comprises fifth means arranged and adapted to progressively increase, progressively decrease, progressively vary, scan, linearly increase, linearly decrease, increase in a stepped, progressive or other manner or decrease in a stepped, progressive or other manner the amplitude of the second AC or RF voltage applied to the electrodes.

The fifth means is preferably arranged and adapted to progressively increase, progressively decrease, progressively vary, scan, linearly increase, linearly decrease, increase in a stepped, progressive or other manner or decrease in a stepped, progressive or other manner the amplitude of the second AC or RF voltage by $x_5$ Volts over a time period $t_5$. Preferably, $x_5$ is selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V-peak to peak; (viii) 350-400 V peak to peak; (ix) 400-450 V peak to peak; (x) 450-500 V peak to peak; and (xi) >500 V peak to peak. Preferably, $t_5$; is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

The mass analyser preferably further comprises sixth means arranged and adapted to progressively increase, progressively decrease, progressively vary, scan, linearly increase, linearly decrease, increase in a stepped, progressive or other manner or decrease in a stepped, progressive or other manner the frequency of the second RF or AC voltage applied to the electrodes.

The sixth means is preferably arranged and adapted to progressively increase, progressively decrease, progressively vary, scan, linearly increase, linearly decrease, increase in a stepped, progressive or other manner or decrease in a stepped, progressive or other manner the frequency of the second RF or AC voltage applied to the electrodes by $x_6$ MHz over a time period tr. Preferably, $x_6$ is selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 M-Hz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz. Preferably, $t_6$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 as; (xiv) 300-400 ms; (xv) 400-500 ms; (xvi) 500-600 ms; (xvii) 600-700 ms; (xviii) 700-800 is; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to an embodiment the mass analyser may further comprise seventh means arranged and adapted to progressively increase, progressively decrease, progressively vary, scan, linearly increase, linearly decrease, increase in a stepped, progressive or other manner or decrease in a stepped, progressive or other manner the amplitude of a DC voltage or potential applied to at least some of the electrodes of the ion guide and which acts to confine ions in a radial direction within the ion guide.

The seventh means is preferably arranged and adapted to progressively increase, progressively decrease, progressively vary, scan, linearly increase, linearly decrease, increase in a stepped, progressive or other manner or decrease in a stepped, progressive or other manner the amplitude of the DC voltage or potential applied to the at least some electrodes by $x_7$ Volts over a time period $t_7$. Preferably, $x_7$ is selected from the group consisting of: (i) <0.1V; (ii) 0.1-0.2 V; (iii) 0.2-0.3 V; (iv) 0.3-0.4 V; (v) 0.4-0.5 V; (vi) 0.5-0.6 V; (vii) 0.6-0.7 V; (viii) 0.7-0.8 V; (ix) 0.8-0.9 V; (x) 0.9-1.0 V; (xi) 1.0-1.5 V; (xii) 1.5-2.0 V; (xiii) 2.0-2.5 V; (xiv) 2.5-3.0 V; (xv) 3.0-3.5 V; (xvi) 3.5-4.0 V; (xvii) 4.0-4.5 V; (xviii) 4.5-5.0 V; (xix) 5.0-5.5 V; (xx) 5.5-6.0 V; (xxi) 6.0-6.5 V; (xxii) 6.5-7.0 V; (xxiii) 7.0-7.5 V; (xxiv) 7.5-8.0 V; (xxv) 8.0-8.5 V; (xxvi) 8.5-9.0 V; (xxvii) 9.0-9.5 V; (xxviii) 9.5-10.0 V; and (xxix) >10.0 V. Preferably, $t_7$ is selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to an embodiment the mass analyser may further comprise means arranged and adapted to progressively increase, progressively decrease, progressively vary, scan, linearly increase, linearly decrease, increase in a stepped, progressive or other manner or decrease in a stepped, progressive or other manner the amplitude of the first RF or AC voltage applied to the electrodes in tandem with the amplitude of the second RF or AC voltage applied to the electrodes.

The mass analyser may further comprise means arranged and adapted to progressively increase, progressively decrease, progressively vary, scan, linearly increase, linearly decrease, increase in a stepped, progressive or other manner or decrease in a stepped, progressive or other manner the frequency of the first RF or AC voltage applied to the electrodes in tandem with the frequency of the second RF or AC voltage applied to the electrodes.

The mass analyser may further comprise means arranged and adapted to progressively increase, progressively decrease, progressively vary, scan, linearly increase, linearly decrease, increase in a stepped, progressive or other manner or decrease in a stepped, progressive or other manner the phase difference between the first RF or AC voltage applied to the electrodes and the second RF or AC voltage applied to the electrodes.

According to an embodiment the mass analyser further comprises means for maintaining in a mode of operation the ion guide at a pressure selected from the group consisting of: (i) <$1.0\times10^{-1}$ mbar; (ii) <$1.0\times10^{-2}$ mbar; (iii) <$1.0\times10^{-3}$ mbar; and (iv) <$1.0\times10^{-4}$ mbar. According to an embodiment the mass analyser further comprises means for maintaining in a mode of operation the ion guide at a pressure selected from the group consisting of: (i) >$1.0\times10^{-3}$ mbar; (ii) >$1.0\times10^{-2}$ mbar; (iii) >$1.0\times10^{-1}$ mbar; (iv) >1 mbar; (v) >10 mbar; (vi) >100 mbar; (vii) >$5.0\times10^{-3}$ mbar; (vii) >$5.0\times10^{-2}$ mbar; (ix) $10^{-4}$-$10^{-3}$ mbar; (x) $10^{-3}$-$10^{-2}$ mbar; and (xi) $10^{-2}$-$10^{-1}$ mbar.

According to an embodiment the mass analyser further comprises means arranged and adapted to progressively increase, progressively decrease, progressively vary, scan, linearly increase, linearly decrease, increase in a stepped, progressive or other manner or decrease in a stepped, progressive or other manner the gas flow through the ion guide.

In a mode of operation ions are arranged to exit the mass analyser substantially in reverse order of mass to charge ratio so that ions having a relatively high mass to charge ratio exit the mass analyser prior to ions having a relatively low mass to charge ratio.

In a mode of operation ions are preferably arranged to be trapped but are not substantially fragmented within the ion guide.

According to an embodiment the mass analyser further comprises means for collisionally cooling or substantially thermalising ions within the ion guide.

According to an embodiment the mass analyser further comprises means for substantially fragmenting ions within the ion guide in a mode of operation.

The mass analyser preferably further comprises one or more electrodes arranged at the entrance and/or exit of the ion guide, herein in a mode of operation ions are pulsed into and/or out of the ion guide.

The mass analyser preferably has a cycle time selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to another aspect of the present invention there is provided a mass spectrometer comprising a mass analyser as described above.

The mass spectrometer preferably further comprises an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("PAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; and (xvii) a Thermospray ion source.

The ion source may comprise a continuous or pulsed ion source.

The mass spectrometer may further comprise one or more mass filters arranged upstream and/or downstream of the mass analyser. The one or more mass filters may be selected from the group consisting of: (i) a quadrupole rod set mass filter; (ii) a Time of Flight mass filter or mass analyser; (iii) a Wein filter; and (iv) a magnetic sector mass filter or mass analyser.

The mass spectrometer may comprise one or more second ion guides or ion traps arranged upstream and/or downstream of the mass analyser.

The one or more second ion guides or ion traps may be selected from the group consisting of:

(i) a multipole rod set or a segmented multipole rod set ion guide or ion trap comprising a quadrupole rod set, a hexapole rod set, an octapole rod set or a rod set comprising more than eight rods;

(ii) an ion tunnel or ion funnel on guide or ion trap comprising a plurality of electrodes or at least 2, 5, 10, 20, 30, 40, 50, 60, 70, 80, 90 or 100 electrodes having apertures through which ions are transmitted in use, wherein at least 1%, 5%, 10%, 15%, 20%, 25%, 30%, 35%, 40%, 45%, 50%, 55%, 60%, 65%, 70%, 75%, 80%, 85%, 90%, 95% or 100% of the electrodes have apertures which are of substantially the same size or area or which have apertures which become progressively larger and/or smaller in size or in area;

(iii) a stack or array of planar, plate or mesh electrodes, wherein the stack or array of planar, place or mesh electrodes comprises a plurality or at least 2, 3, 4, 5, 6, 7, 8, 9, 10, 11, 12, 13, 14, 15, 16, 17, 18, 19 or 20 planar, plate or mesh electrodes or at least 1%, 5%, 10%, 15%, 20%, 25%, 30%, 35%, 40%, 45%, 50%, 55%, 60%, 65%, 70%, 75%, 80%, 85%, 90%, 95% or 100% of the planar, plate or mesh electrodes are arranged generally in the plane in which ions travel in use; and (iv) an ion trap or ion guide comprising a plurality of groups of electrodes arranged axially along the length of the ion trap or ion guide, wherein each group of electrodes comprises; (a) a first and a second electrode and means for applying a DC voltage or potential to the first and second electrodes in order to confine ions in a first radial direction within the ion guide; and (b) a third and a fourth electrode and means for applying an AC or RF voltage to the third and fourth electrodes in order to confine ions in a second radial direction within the ion guide.

The second ion guide or ion trap may comprise an ion tunnel or ion funnel ion guide or ion trap and wherein at least 1%, 5%, 10%, 15%, 20%, 25%, 30%, 35%, 40%, 45%, 50%, 55%, 60%, 65%, 70%, 75%, 80%, 85%, 90%, 95% or 100% of the electrodes have internal diameters or dimensions selected from the group consisting of: (i) ≤1.0 mm; (ii) ≤2.0 mm; (iii) ≤3.0 mm; (iv) ≤4.0 mm; (v) ≤5.0 mm; (vi) ≤6.0 mm; (vii) ≤7.0 mm; (viii) ≤8.0 mm; (ix) ≤9.0 mm; (x) ≤10.0 mm; and (xi) >10.0 mm.

The second ion guide or ion trap may further comprise second ion guide AC or RF voltage means arranged and adapted to apply an AC or RF voltage to at least 1%, 5%, 10%, 15%, 20%, 25%, 30%, 35%, 40%, 45%, 50%, 55%, 60%, 65%, 70%, 75%, 80%, 85%, 90%, 95% or 100% of the plurality of electrodes of the second ion guide or ion trap in order to confine ions radially within the second ion guide or ion trap.

The second ion guide or ion trap may be arranged and adapted to receive a beam or group of ions from the mass analyser and to convert or partition the beam or group of ions such that at least 1, 2, 3, 4, 5, 6, 7, 8, 9, 10, 11, 12, 13, 14, 15, 16, 17, 18, 19 or 20 separate packets of ions are confined and/or isolated within the second ion guide or ion trap at any particular time, and wherein each packet of ions is separately confined and/or isolated in a separate axial potential well formed in the second ion guide or ion trap.

The mass spectrometer may further comprise means arranged and adapted to urge at least some ions upstream and/or downstream through or along at least 1%, 5%, 10%, 15%, 20%, 25%, 30%, 35%, 40%, 45%, 50%, 55%, 60%, 65%, 70%, 75%, 80%, 85%, 90%, 95% or 100% of the axial length of the second ion guide or ion trap in a mode of operation.

According to an embodiment the mass spectrometer may further comprise transient DC voltage means arranged and adapted to apply one or more transient DC voltages or potentials or one or more transient DC voltage or potential waveforms to the electrodes forming the second ion guide or ion trap in order to urge at least some ions downstream and/or upstream along at least 1%, 5%, 10%, 15%, 20%, 25%, 30%, 35%, 40%, 45%, 50%, 55%, 60%, 65%, 70%, 75%, 80%, 85%, 90%, 95% or 100% of the axial length of the second ion guide or ion trap.

According to an embodiment the mass spectrometer may comprise AC or RF voltage means arranged and adapted to apply two or more phase-shifted AC or RF voltages to electrodes forming the second ion guide or ion trap in order to urge at least some ions downstream and/or upstream along at least 1%, 5%, 10%, 15%, 20%, 25%, 30%, 35%, 40%, 45%, 50%, 55%, 60%, 65%, 70%, 75%, 80%, 85%, 90%, 95% or 1.00% of the axial length of the second ion guide or ion trap.

The mass spectrometer may comprise means arranged and adapted to maintain at least a portion of the second ion guide or ion trap at a pressure selected from the group consisting of: (i) >0.0001 mbar; (ii) >0.001 mbar; (iii) >0.01 mbar; (iv) >0.1 mbar; (v) >1 mbar; (vi) >10 mbar; (vii) >1 mbar; (viii) 0.0001-100 mbar; and (ix) 0.001-10 mbar.

The mass spectrometer may further comprise a collision, fragmentation or reaction device arranged and adapted to fragment ions by Collision Induced Dissociation ("CID"). According to another embodiment the mass spectrometer may comprise a collision, fragmentation or reaction device selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

The mass spectrometer may further comprise means arranged and adapted to progressively increase, progressively decrease, progressively vary, scan, linearly increase, linearly decrease, increase in a stepped, progressive or other manner or decrease in a stepped, progressive or other manner the potential difference between the mass analyser and the collision, fragmentation or reaction cell during or over the cycle time of the preferred mass analyser.

According to an embodiment the mass spectrometer may further comprise a further mass analyser arranged downstream of the preferred mass analyser. The further mass analyser may be selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Flight mass analyser; (vi) a magnetic sector mass spectrometer; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic ion Cyclotron Resonance mass spectrometer; (xiii) an electrostatic Fourier Transform mass spectrometer; and (xiv) a quadrupole rod set mass filter or mass analyser.

The mass spectrometer may further comprise means arranged and adapted to progressively increase, progressively decrease, progressively vary, scan, linearly increase, linearly decrease, increase in a stepped, progressive or other manner or decrease in a stepped, progressive or other manner the mass to charge ratio transmission window of the further analyser in synchronism with the operation of the mass analyser during or over the cycle time of the preferred mass analyser.

According to another aspect of the present invention there is provided a method of mass analysing ions comprising:

providing an ion guide comprising a plurality of electrodes;

applying a first AC or RP voltage having a first frequency and a first amplitude to at least some of the plurality of electrodes such that one or more axial time averaged or pseudo-potential barriers, corrugations or wells are created along at least a portion of the axial length of the ion guide;

applying a second AC or RF voltage having a second frequency and a second amplitude to one or more of the plurality of electrodes in order to confine ions radially within the ion guide; and driving or urging ions along and/or through at least a portion of the axial length of the ion guide so that in a mode of operation ions having mass to charge ratios within a first range exit the ion guide whilst ions having mass to charge ratios within a second different range are axially trapped or confined within the ion guide by the plurality of axial time averaged or pseudo-potential barriers, corrugations or wells.

According to another aspect of the present invention there is provided a method of mass spectrometry comprising the method of mass analysing ions as described above.

According to another aspect of the present invention there is provided a mass analyser comprising an ion guide wherein two AC or RF voltages having different amplitudes and/or frequencies and/or phases are applied in use to the ion guide and wherein a plurality of axial time averaged or pseudo-potential barriers, corrugations or wells are created along at least a portion of the axial length of the ion guide.

According to another aspect of the present invention there is provided a method of analysing ions comprising:

providing an ion guide; and applying two AC or RF voltages having different amplitudes and/or frequencies and/or phases to the ion guide wherein a plurality of axial time averaged or pseudo-potential barriers, corrugations or wells are created along at least a portion of the axial length of the ion guide.

The preferred embodiment relates to a mass analyser comprising an ion guide wherein ions are separated according to their mass to charge ratio in contrast to known ion guides which are arranged to transmit ions without separating the ions according to their mass to charge ratio. A particularly advantageous features of the preferred mass analyser is that the preferred mass analyser may be operated at much higher pressures than conventional mass analysers.

According to a preferred embodiment the mass analyser comprises a stacked ring or ion tunnel ion guide. The stacked ring or ion tunnel ion guide preferably comprises a plurality of electrodes having apertures through which ions are transmitted in use.

A first AC or RF voltage is preferably applied to the electrodes of the mass analyser and preferably causes a plurality of axial pseudo-potential corrugations or axial pseudo-potential hills or wells to be provided or created along the axial length of the mass analyser. The axial pseudo-potential corrugations or axial pseudo-potential hills preferably take the form of alternating pseudo-potential minima and maxima along the axis of the mass analyser.

The pseudo-potential minima and maxima preferably may have the same periodicity as the axial spacing of the electrodes or more preferably may have the same periodicity as groups of electrodes.

The relative amplitude of the pseudo-potential minima and maxima is preferably dependent upon the ratio of the size of the aperture of the ring electrodes to the axial spacing between adjacent ring electrodes. This ratio is preferably optimised to ensure that axial pseudo-potential corrugations having a relatively large amplitude, height or depth are created. This potentially enables a high resolution mass analyser to be provided.

A second AC or RF voltage is preferably applied to the electrodes of the ion guide in order to confine ions radially within the ion guide in an optimal manner. The second AC or RF voltage is preferably applied to the electrodes so that alternating electrodes are preferably connected to opposite phases of the second AC or RF voltage.

According to another preferred embodiment the mass analyser may comprise a rectilinear ion guide. The ion guide may comprise a plurality of groups of electrodes. Each group of electrodes may comprise four plate electrodes. A DC voltage or potential is preferably applied to two of the plate electrodes in order to confine ions in a first radial direction within the ion guide. An AC or RF voltage is preferably applied to the two other plate electrodes in order to confine ions in a second radial direction within the ion guide. The second radial direction is preferably orthogonal to the first radial direction.

According to the preferred embodiment a population of ions having different mass to charge ratios is preferably introduced into the mass analyser. The ions are then preferably caused to exit the mass analyser at different times according to their mass to charge ratio.

The population of ions may be introduced substantially simultaneously into the mass analyser at an entrance end of the mass analyser. Ions are preferably arranged to emerge from the mass analyser at an exit end of the mass analyser. The ions preferably emerge from the mass analyser in reverse order of their mass to charge ratio.

According to the preferred embodiment the axial pseudo-potential undulations or axial pseudo-potential corrugations along the axis of the mass analyser preferably have a significant amplitude and are preferably capable of axially trapping some ions unlike a conventional ion guide.

Ions are preferably driven or urged along the length of the ion guide or mass analyser either by applying one or more transient DC voltage or potentials to the electrodes or by applying a constant DC axial electric field. Ions are therefore preferably driven along the length of the ion guide or mass analyser against the periodic ripple in the axial effective potential.

According to the preferred embodiment the axial pseudo-potential corrugations are purposefully created by appropriate choice of electrode spacing and by careful application of an appropriate RF voltage having an appropriate frequency and amplitude. The axial pseudo-potential corrugations preferably have a relatively large amplitude.

The resulting ripple in the axial effective potential is preferably inversely proportional to the mass to charge ratio of ions at any particular value of the applied RF voltage.

Various approaches may be adopted in order to scan ions out of the ion guide or mass analyser. According to various embodiments ions may be scanned out of the ion guide or mass analyser by: (i) scanning the RF amplitude (s) whilst keeping the driving field constant; (ii) scanning the driving field whilst keeping the amplitude of the RF voltage(s) constant; (iii) increasing the magnitude of the one or more transient DC voltages applied to the ion guide or mass analyser whilst keeping the RF amplitude(s) constant; (iv) scanning the amplitude of the RF voltage s) whilst keeping the amplitude of the one or more transient DC voltages constant; or (v) a combination of any of the above methods.

The magnitude of the ripple in the effective potential preferably depends upon the aspect ratio (width to spacing) of the electrodes forming the ion guide. According to an embodiment an oscillatory RF potential of a common phase is preferably applied to a plurality of adjacent electrodes in order to create a plurality of axial pseudo-potential corrugations. The aspect ratio of the ion guide or mass analyser can be determined by choosing the number of adjacent electrodes connected in this manner.

Accordingly, the periodicity in the oscillatory RF potential is preferably established between groups of RF electrodes which form subsets of electrodes. The greater the magnitude of the mass to charge ratio dependent ripple the greater the potential resolution of the mass analyser. However, whilst increasing the aspect ratio increases the amplitude of the ripples for a given RF frequency and voltage, the overall radial confining effective potential is reduced. This can lead to a loss of confinement of ions, especially of relatively high mass to charge ratio ions. As a result the mass to charge ratio range of operation of the preferred mass analyser may be reduced or may be relatively limited.

According to the preferred embodiment of the present invention an additional or second ion trapping oscillatory RF potential is preferably applied to alternating electrodes. This second RF potential is preferably intended to maximise the radial confinement of ions with the preferred mass analyser. Accordingly, for an ion tunnel ion guide or mass analyser alternate ring electrodes are preferably connected to opposite phases of the additional or second RF potential. For an ion guide comprising a plurality of groups of plate electrodes, each group comprising two pairs of plate electrodes, alternate groups of electrodes are preferably connected to opposite phases of the additional or second RF potential.

The additional or second RF potential which is preferably applied to the electrodes in order to optimise the radial confinement of ions within the mass analyser may have a different frequency and/or amplitude to the RF potential which is preferably applied to the electrodes of the ion guide or mass analyser in order to create a plurality of axial pseudo-potential corrugations. The additional or second RF potential preferably acts to confine relatively high mass to charge ratio ions within the mass analyser which might otherwise have a tendency to strike the electrodes of the ion guide or mass analyser and hence become lost to the system. The additional second RF potential preferably causes a relatively strong radial pseudo-potential barrier to be created preferably without significantly affecting the effective potential profile along the axis of the ion guide or mass analyser.

A particular advantage of the preferred embodiment is the extra degree of freedom which results from applying two separate RF signals to the electrodes of the mass analyser. The amplitude and/or frequency and/or phase of the two RF signals may be different. This enables the mass analyser to be optimised in terms of confinement, mass range and mass separation or mass resolution.

The form of the two RF signals takes four different combinations when two RF signals are used. Each electrode may be identified uniquely by an n and p prefix. The electrodes are preferably numbered sequentially from 1 to n. Electrodes are preferably also grouped into p subsets of electrodes. So for example, the first four electrodes (n=1, 2, 3 and 4) may form the first subset of electrodes p=1. The next four electrodes (n=5, 6, 7 and 8) may form the second subset of electrodes p=2. The following four electrodes (n 9, 10, 11 and 12) may form the third subset of electrodes p=3. The RF signal applied to an electrode may be given by:

$$V_{n,p}=A\cdot\cos\,\omega_1 t+B\,\cos(\omega_2 t+\phi)n_{odd},p_{odd}$$

$$V_{n,p}=-A\cdot\cos\,\omega_1 t+B\,\cos(\omega_2 t+\phi)\;n_{even},p_{odd}$$

$$V_{n,p}=A\cdot\cos\,\omega_1 t-B\,\cos(\omega_2 t+\phi)\;n_{odd},p_{even}$$

$$V_{n,p}=-A\cdot\cos\,\omega_1 t-B\,\cos(\omega_2 t+\phi)\;n_{even},p_{even}$$

The two RF voltages preferably have distinct frequencies $\omega_2$ and $\omega_2$ and corresponding amplitudes A and B respectively. In addition to this there is a phase term $\phi$ representing the fact that a phase difference may be introduced between the two RF signals. In the simplest case where $\omega_1=\omega_2$ a 90° phase shift of $\omega_1$ with respect to $\omega_2$ may preferably be employed in order to avoid unwanted trapping effects and to minimise peak to peak voltage differences between electrodes.

The pseudo-potential Ψ(R,Z) within an RF ring stack or ion tunnel ion guide as a function of radial distance R and axial position Z.n is given by:

$$\Psi(R,Z):=\frac{z\cdot e\cdot Vo^2}{4\cdot m\cdot\omega^2\cdot Zo^2}\cdot\frac{I1\left(\frac{R}{Zo}\right)^2\cdot\cos\left(\frac{Z}{Zo}\right)^2+I0\left(\frac{R}{Zo}\right)^2\cdot\sin\left(\frac{Z}{Zo}\right)^2}{I0\left(\frac{Ro}{Zo}\right)^2}\qquad(1)$$

wherein m/z is the mass to charge ratio of an ion, e is the electronic charge, Vo is the peak RF voltage, ω is the angular frequency of the applied RF voltage, Ro is the radius of the aperture in an electrode, Zo.n is the centre to centre spacing between adjacent ring electrodes, IO is a zeroth order modified Bessel function of the first kind and I1 is a first order modified Bessel function of the first kind.

It is apparent from the above equation that the amplitude, height or depth of the axial pseudo-potential corrugations which are preferably created or formed along the length of the mass analyser are inversely proportional to the mass to charge ratio of an ion. Therefore, the axial pseudo-potential corrugations experienced by ions having a mass to charge ratio of, for example, 1000 will have an amplitude, height or depth which is 10% of the amplitude, height or depth of the axial pseudo-potential corrugations experienced by ions having a lower mass to charge ratio 100. Therefore, if ions are urged along the length of the mass analyser then ions having a mass to charge ratio of 100 will effectively experience more resistance to axial motion than ions having a higher mass to charge ratio of 1000. This is because ions having a mass to charge ratio of 100 will experience axial pseudo-potential corrugations which have a relatively large amplitude, height or depth whereas ions having a mass to charge ratio of 1000 will experience axial pseudo-potential corrugations having only a relatively low amplitude, height or depth.

According to the preferred, embodiment ions are preferably propelled or urged through or along the axial length of the mass analyser by progressively applying one or more transient DC potentials or voltages or DC potential or voltage waveforms to the electrodes of the ion guide or mass analyser. The rate of progression of ions along the length of the mass analyser preferably depends upon the amplitude of the one or more transient DC potentials or voltages or DC potential or voltage waveforms which are applied to the electrodes relative to the amplitude, height or depth of the axial pseudo-potential corrugations which are created along the length of the mass analyser.

If the ions have become thermalised as a result of repeated collisions with buffer gas then if the amplitude of the one or more transient DC potentials or voltages or DC potential or voltage waveform applied to the electrodes is fixed then the progression of ions along the length of the mass analyser will be dependent upon the amplitude, height or depth of the axial pseudo-potential corrugations which are experienced by ions. However, the amplitude, height or depth of the axial pseudo-potential corrugations is dependent upon the mass to charge ratio of the ion. Therefore, the progression of ions along the length of the mass analyser will be dependent upon the mass to charge ratio of the ions and hence ions will therefore be mass analysed.

If the amplitude of the applied one or more transient DC potentials or voltages or DC potential or voltage waveforms is substantially less than the amplitude, height or depth of the axial pseudo-potential corrugations for ions having a particular mass to charge ratio then these ions will not be driven along the length of the mass analyser by the application of the one or more transient DC potentials or voltages or DC potential or voltage waveforms to the electrodes of the mass analyser.

If the amplitude of the applied one or more transient DC potentials or voltages or DC potential or voltage waveforms is substantially greater than that of the amplitude, height or depth of the axial pseudo-potential corrugations for ions having a particular mass to charge ratio then these ions will be driven along the length of the mass analyser. The ions will preferably be driven along the length of the mass analyser at substantially the same velocity or rate at which the one or more transient DC voltages or potentials or DC potential or voltage waveforms are progressively applied to the electrodes.

If the amplitude of the one or more transient DC potentials or voltages or DC potential or voltage waveforms is approximately similar to the amplitude, height or depth of the axial pseudo-potential corrugations for ions having a particular mass to charge ratio then these ions may still be driven along the length of the mass analyser but their average velocity will be somewhat less than the velocity or rate at which the one or more transient DC voltages or potentials or DC potential or voltage waveforms is progressively applied to the electrodes.

The amplitude, height or depth of the axial pseudo-potential corrugations experienced by ions having a relatively high mass to charge ratio is preferably lower than the amplitude, height or depth of the axial pseudo-potential corrugations which is preferably experienced by ions having a relatively low mass to charge ratio. Accordingly, if one or more transient DC potentials or voltages or DC potential or voltage waveforms having a particular amplitude is applied to the electrodes, then ions having a relatively high mass to charge ratio will be propelled along the axis of the mass analyser with a velocity or at a rate which will preferably substantially correspond with the velocity or rate at which the one or more transient DC potentials or voltages or DC potential or voltage waveforms is applied to the electrodes. However, ions having a relatively low mass to charge ratio will not be propelled along the length of the mass analyser since the amplitude, height or depth of the axial pseudo-potential corrugations for these ions will be greater than the amplitude of the one or more transient DC potentials or voltages or DC potential or voltage waveforms which is applied to the electrodes.

Ions having intermediate mass to charge ratios will progress along the axis of the mass analyser but with a velocity or at a rate which is preferably less than the velocity or rate at which the one or more transient DC potentials or voltages or DC potential or voltage waveforms is applied to the electrodes. Hence, if one or more transient DC voltages or potentials or DC potential or voltage waveforms having an appropriate amplitude is applied to the electrodes then ions having a mass to charge ratio of 1000 will traverse the length of the mass analyser in a shorter time than ions having a mass to charge ratio of 100.

According to the preferred embodiment the amplitude, height or depth of the axial pseudo-potential corrugations which are preferably formed or created along the length of the mass analyser can be preferably maximised by minimising the ratio (Ro/Zo) of the diameter of the internal aperture of the electrodes forming the mass analyser through which ions are transmitted to the spacing between adjacent electrodes e.g. by making the diameter of the apertures of the electrodes as small as possible and/or by making the spacing between adjacent electrodes as large as possible (whilst still ensuring that ions are radially confined within the mass analyser). The resulting relatively large amplitude, height or depth pseudo-potential corrugations which are preferably created or formed along the central axis of the mass analyser preferably increases the resistance to movement of ions along the central axis of the mass analyser and preferably enhances the effectiveness of the mass to charge ratio separation process which preferably occurs when one or more transient DC voltages or potentials or DC voltage or potential waveforms are preferably applied to the electrodes in order to urge or sweep ions along and over the axial pseudo-potential corrugations and hence along the length of the ion guide.

According to the preferred embodiment a population of ions may be pulsed at a time T0 into the preferred mass analyser. At time T0 the amplitude of one or more transient DC potentials or voltages or DC potential or voltage waveforms which is preferably applied to the electrodes may preferably be set to a minimum or zero value. The amplitude of the one or more transient DC potentials or voltages or DC potential or voltage waveforms may then be progressively scanned, ramped, increased or stepped up in amplitude to a final maximum amplitude over the scan period of the preferred mass analyser. Initially, ions having a relatively high mass to charge ratio will preferably emerge from the mass analyser. As the amplitude of the one or more transient DC voltages or potentials or DC potential or voltage waveforms applied to the electrodes is preferably increased with time then ions having progressively lower mass to charge ratios will preferably emerge from the mass analyser. Ions will therefore preferably be caused to exit the mass analyser in reverse order of their mass to charge ratio as a function of time so that ions having relatively high mass to charge ratios will exit the preferred mass analyser prior to ions having relatively low mass to charge ratios. Once a group of ions has been separated according to their mass to charge ratio and all the ions have exited the mass analyser then the process is then preferably repeated and one or more further groups of ions are preferably admitted into the mass analyser and are then subsequently mass analysed in a subsequent scan period.

The time between injecting pulses or groups of ions into the mass analyser can be varied in a substantially synchronised manner with the time period over which the amplitude of the one or more transient DC voltages or potentials or DC potential or voltage waveforms is increased from a minimum value to a maximum value. Therefore, the separation time or cycle time of the preferred mass analyser can be varied or set from, for example, tens of milliseconds up to several seconds without significantly affecting the separation ability or resolution of the mass analyser.

The preferred mass analyser is advantageously capable of separating ions according to their mass to charge ratio at relatively high operating pressures which may be, for example, in the range $10^{-3}$ mbar to $10^{-3}$ mbar. It will be appreciated that such operating pressures are substantially higher than the operating pressures of conventional mass analysers which typically operate at a pressure of $<10^{-5}$ mbar (wherein the pressure is sufficiently low such that the mean free path of gas molecules is substantially longer than the flight path of the ions within the mass analyser).

The operating pressure range of the preferred mass analyser is substantially comparable to the operating pressure of ion guides and gas collision cells in conventional mass spectrometers. A person skilled in the art will appreciate that the relatively high operating pressure of the preferred mass analyser can be achieved using a roughing pump, such as a rotary pump or scroll pump. Therefore, the preferred mass analyser enables ions to be mass analysed without necessarily having to provide an expensive fine vacuum pump such as a turbomolecular pump or diffusion pump.

The preferred mass analyser preferably has a very high transmission efficiency since substantially all ions received by the preferred mass analyser are onwardly transmitted.

The preferred mass analyser may be combined with or coupled to an ion storage region or ion trap which may be arranged or provided upstream of the preferred mass analyser. The ion storage region or ion trap may be arranged to accumulate and store ions whilst other ions are preferably being mass analysed by the preferred mass analyser. A mass spectrometer comprising an upstream ion trap and a preferred mass analyser will preferably have a relatively high duty cycle.

According to an embodiment an ion storage region or ion trap may be provided upstream of a preferred mass analyser and a second or further mass analyser may be provided downstream of the preferred mass analyser. The second or further mass analyser may comprise either an orthogonal acceleration Time of Flight mass analyser or a quadrupole rod set mass analyser. According to this embodiment a mass spectrometer is provided which preferably has a high duty cycle, high transmission efficiency and improved mass resolution.

The preferred mass analyser may be coupled to various types of mass analyser. The capability of the preferred mass analyser to transmit ions in reverse order of mass to charge ratio over a time period or cycle time which can be fixed or set as desired preferably enables the preferred mass analyser to be coupled to various other devices which may have varying or different cycle times. For example, the preferred mass analyser may be coupled to a Time of Flight mass analyser arranged downstream of the preferred mass analyser in which case the preferred mass analyser may be arranged to have a mass separation or cycle time of tens of milliseconds. The preferred mass analyser may alternatively be coupled to a quadrupole rod set mass analyser arranged downstream of the preferred mass analyser which is arranged to be scanned. In this case the preferred mass analyser may be operated with a mass separation or cycle time of hundreds of milliseconds.

The preferred mass analyser may be combined or coupled to an axial acceleration Time of Flight mass analyser, an orthogonal acceleration Time of Flight mass analyser, a 3D quadrupole ion trap, a linear quadrupole ion trap, a quadrupole rod set mass filter or mass analyser, a magnetic sector mass analyser, an ion cyclotron resonance mass analyser or an orbitrap mass analyser. The further mass analyser may comprise a Fourier Transform mass analyser which may employ Fourier transforms of mass dependant resonance frequencies in order to mass analyse ions. According to a particularly preferred embodiment the preferred mass analyser may be combined with or coupled to either an orthogonal acceleration Time of Flight mass analyser or a quadrupole rod set mass analyser.

According to an embodiment the preferred mass analyser may be provided upstream of an orthogonal acceleration Time of Flight mass analyser. In a conventional orthogonal acceleration Time of Flight mass analyser ions possessing approximately the same energy are arranged to pass through an orthogonal acceleration region in which an orthogonal acceleration electric field is periodically applied. The length of the orthogonal acceleration region in which the orthogonal acceleration electric field is applied, the energy of the ions and the frequency of application of the orthogonal acceleration electric field will determine the sampling duty cycle for sampling ions for subsequent analysis in the Time of light mass analyser. Ions entering the orthogonal acceleration region possessing approximately the same energy but having different mass to charge ratios will have different velocities as they pass through the orthogonal acceleration region. Therefore, some ions may have passed beyond the orthogonal acceleration region and other ions may yet to have reached the orthogonal acceleration region at the time when the orthogonal acceleration electric field is applied in order to orthogonally accelerate ions into the drift region or time of flight region of the mass analyser. It is therefore apparent that in a conventional orthogonal acceleration Time of Flight mass analyser ions having different mass to charge ratios will have different sampling duty cycles.

According to the preferred embodiment ions are preferably released from the preferred mass analyser as a succession of packets of ions wherein the ions in each packet will preferably have a relatively narrow range of mass to charge ratios and hence also a relatively narrow spread of velocities. According to the preferred embodiment all the ions within a packet of ions released from the preferred mass analyser can preferably be arranged to arrive within the orthogonal acceleration region of the Time of Flight mass analyser at substantially the same time that an orthogonal acceleration electric field is applied. As a result a high sampling duty cycle can be achieved according to the preferred embodiment.

In order to achieve a high overall sampling duty cycle each packet of ions is preferably released from the preferred mass analyser such that the time for ions in a packet to arrive at the orthogonal acceleration region of the Time of Flight mass analyser is sufficiently short such that the ions do not have sufficient time in which to disperse axially to any significant degree. Therefore, any axial dispersal of the ions will preferably be shorter than the length of the orthogonal acceleration region in which the orthogonal acceleration electric field is subsequently, applied. According to the preferred embodiment the distance between the point at which ions are released from the preferred mass analyser and the orthogonal acceleration region of the Time of Flight mass analyser may be arranged to be relatively short given the energy of the ions and the mass to charge ratio range of ions within any packet of ions released from the preferred mass analyser.

The mass to charge ratio range of ions within each packet of ions released from the preferred mass analyser is preferably arranged to be relatively narrow. The orthogonal acceleration electric field is preferably applied in synchronism with the arrival of ions at the orthogonal acceleration region of the Time of Flight mass analyser. According to the preferred embodiment it is possible to achieve substantially a 100% sampling duty cycle for all the ions in a packet of ions released from the preferred mass analyser. If the same conditions are applied to each subsequent packet of ions released from the preferred mass analyser then an overall sampling duty cycle of substantially 100% can be achieved according to the preferred embodiment.

According to an embodiment a preferred mass analyser is preferably coupled to an orthogonal acceleration Time of Flight mass analyser such that a substantially 100% sampling duty cycle is obtained. An ion guide may be provided downstream of the preferred mass analyser and upstream of the orthogonal acceleration Time of Flight mass analyser in order to assist in ensuring that a high sampling duty cycle is obtained. Ions are preferably arranged to exit the preferred mass analyser and are preferably received by the ion guide. Ions which emerge from the preferred mass analyser are preferably trapped in one of a plurality of real axial potential wells which are preferably transported or translated along the length of the ion guide. According to one embodiment one or more transient DC voltages or potentials or DC voltage or potential waveforms may preferably be applied to the electrodes of the ion guide such that one or more real axial potential wells or potential barriers preferably move along the axis or length of the ion guide. The preferred mass analyser and the downstream ion guide are preferably sufficiently closely coupled such that the ions emerging from the exit of the preferred mass analyser are preferably transported or translated in a succession of packets or separate axial potential wells along and through the length of the ion guide. The ions are preferably transported or translated along the length of the ion guide in substantially the same order that they emerged from the exit of the preferred mass analyser. The ion guide and the orthogonal acceleration Time of Flight mass analyser are preferably also closely coupled such that each packet of ions released from the ion guide is preferably sampled by the orthogonal acceleration Time of Flight mass analyser preferably with substantially a 100% sampling duty cycle.

By way of illustration, the cycle time of the preferred mass analyser may be 10 ms. A packet of ions emerging from the exit of the preferred mass analyser may be arranged to be collected and axially translated in one of 200 real axial potential wells which are preferably created within the ion guide during the cycle time of the preferred mass analyser. Accordingly, each axial potential well created in the ion guide preferably receives ions over a 50 μs time period. According to an embodiment the rate of creation of each wave or axial potential well in the ion guide preferably corresponds with the cycle time of the orthogonal acceleration Time of Flight mass analyser. The delay time between the release of packets of ions from the ion guide and the application of an orthogonal acceleration voltage pulse to a pusher electrode of the Time of Flight mass analyser is preferably progressively reduced in time preferably over the cycle time of the mass analyser because the average mass to charge ratio of ions released from the exit of the ion guide will preferably reduce with time.

An ion source is preferably provided upstream of the preferred mass analyser. The ion source may comprise a pulsed ion source such as a Laser Desorption ionisation ("LDI") ion source, a Matrix Assisted Laser Desorption Ionisation ("MALDI") ion source or a Desorption Ionisation on Silicon ("DIOS") ion source. Alternatively, the ion source may comprise a continuous ion source. If a continuous ion source is provided then an ion trap for storing ions and periodically releasing ions into the preferred mass analyser may preferably be provided downstream of the ion source and upstream of the preferred mass analyser. The continuous ion source may comprise an Electrospray Ionisation ("ESI") ion source, an Atmospheric Pressure Chemical ionisation ("APCI") ion source, an Electron Impact ("EI") ion source, an Atmospheric Pressure Photon Ionisation ("APPI") ion source, a Chemical Ionisation ("CI") ion source, a Desorption Electrospray Ionisation ("DESI") ion source, a Atmospheric Pressure MALDI ("AP-MALDI") ion source, a Fast Atom Bombardment ("FAB") ion source, a Liquid Secondary Ion Mass Spectrometry ("LSIMS") ion source, a Field Ionisation ("FI") ion source or a Field Desorption ("FD") ion source. Other continuous or pseudo-continuous ion sources may also be used.

The mass spectrometer may further comprise a collision, fragmentation or reaction cell which may according to an embodiment be provided upstream of the preferred mass analyser. In one mode of operation at least some of the ions entering the collision, fragmentation or reaction cell are caused to fragment or react such that a plurality of fragment, daughter, product or adduct ions are preferably formed. The resulting fragment, daughter, product or adduct ions are then preferably onwardly transmitted or passed from the collision, fragmentation or reaction cell to the preferred mass analyser. The fragment, daughter, product or adduct ions are preferably mass analysed by the preferred mass analyser.

According to an embodiment a mass filter may be provided upstream of the collision, fragmentation or reaction cell. The mass filter may in a mode of operation be arranged to transmit ions having one or more specific mass to charge ratios whilst substantially attenuating all other ions. According to an embodiment specific parent or precursor ions may be selected by the mass filter so that they are onwardly transmitted whilst all other ions are substantially attenuated. The selected parent or precursor ions are then preferably fragmented or reacted as they enter the collision, fragmentation or reaction cell. The resulting fragment, daughter, adduct or product ions are then preferably passed to the preferred mass analyser and the ions are preferably temporally separated as they pass through the preferred mass analyser.

A second mass filter may be provided downstream of the preferred mass analyser. The second mass filter may be arranged such that only specific fragment, daughter, product or adduct ions having one or more specific mass to charge ratios are onwardly transmitted by the second mass filter. The first mass filter and/or the second mass filter may comprise a quadrupole rod set mass filter. However, according to other less preferred embodiments the first mass filter and/or the second mass filter may comprise another type of mass filter.

A mass analyser according to the preferred embodiment is particularly advantageous compared with a conventional mass analyser such as a quadrupole rod set mass analyser in that multiple or substantially all fragment ions which are received by the mass analyser are preferably subsequently detected. The preferred mass analyser is therefore able to mass analyse and onwardly transmit ions with a very high transmission efficiency. In contrast, a conventional scanning quadrupole rod set mass analyser is only able to transmit ions having a particular mass to charge ratio at any particular instance in the time and therefore has a relatively low transmission efficiency.

The preferred mass analyser enables, for example, the relative abundance of two or more specific fragment ions to be measured with a high degree of accuracy. Although a quadrupole rod set mass analyser could be programmed so as to switch to transmit different fragment ions for the purpose of confirming the analysis there is an inevitable corresponding reduction in duty cycle for the measurement of each specific fragment ion. This leads to a loss in sensitivity for each specific fragment ion. In contrast the preferred mass analyser is capable of separating different fragment ions in time such that each species of ion can then be recorded or detected without any loss in duty cycle or sensitivity.

The specificity of the analysis may be further improved by removing any parent or precursor ions which are not of potential interest prior to fragmentation. According to an embodiment ions may be arranged to pass through a mass filter which is preferably positioned upstream of a collision, fragmentation or reaction cell. The mass filter may comprise a quadrupole rod set mass filter although other types of mass filter are also contemplated. The mass filter may be set in a mode of operation to transmit substantially all ions i.e. the mass filter may be arranged to operate in a non-resolving or ion guiding mode of operation. Alternatively, in another mode of operation the mass filter may be set to transmit only specific parent or precursor ions of interest.

The preferred mass analyser preferably onwardly transmits all ions it receives but it may have a lower specificity than a conventional mass analyser such as a quadrupole rod set mass analyser which may have a resolution of unit mass, meaning a resolution of 100 at mass to charge ratio 100, or 200 at mass to charge ratio 200, or 500 at mass to charge ratio 500 and so on.

According to an embodiment of the present invention a further mass filter or mass analyser may be positioned downstream of the preferred mass analyser. The further mass filter or mass analyser is preferably arranged upstream of an ion detector. The further mass filter or mass analyser may comprise a quadrupole rod set mass filter or mass analyser although other types of mass filter or mass analyser are also contemplated. The further mass filter or mass analyser may be operated in a non-resolving mode of operation wherein substantially all ions are onwardly transmitted. Alternatively, the further mass filter or mass analyser may be operated in a mass filtering mode of operation wherein only ions of interest are onwardly transmitted. When the further mass filter or mass analyser is set to transmit all ions then the preferred mass analyser is preferably used exclusively to mass analyse ions.

In an embodiment the further mass filter or mass analyser may be arranged to transmit one or more specific parent or fragment ions. The further mass filter or mass analyser may be arranged to be switched to transmit a number of ions having pre-selected mass to charge ratios at pre-selected times during the course of the separation cycle time of the preferred mass analyser. The pre-selected mass to charge ratios may correspond to the mass to charge ratios of a series of specific parent or fragment ions of interest. The pre-selected times are preferably set to encompass or correspond with the exit times from the preferred mass analyser of the specifically selected parent or fragment ions. As a result, a number of parent or fragment ions may be measured with the specificity of the further mass filter or mass analyser but substantially without any loss in duty cycle and therefore substantially without any loss in sensitivity.

According to an embodiment a further mass filter or mass analyser arranged downstream of a preferred mass analyser is preferably arranged to be scanned substantially in synchronism with the operation of the preferred mass analyser over the cycle time of the preferred mass analyser. The scan law or the progressive variation in the mass to charge ratio transmission window of the further mass filter or mass analyser as a function of time may be arranged to match as closely as possible the relationship between the mass to charge ratio of ions exiting from the preferred mass analyser as a function of time. As a result, a substantial number of parent or fragment ions exiting the preferred mass analyser may preferably be subsequently onwardly transmitted through or by the further mass filter or mass analyser. The further mass filter or mass analyser is preferably arranged to scan from high mass to charge ratio to low mass to charge ratio over the cycle time of the preferred mass analyser since the preferred mass analyser preferably outputs ions in reverse order of mass to charge ratio.

A quadrupole rod set mass filter or mass analyser has a maximum scan rate depending upon the length of the quadrupole rod set. The maximum scan rate may typically be of the order of 100 ms for a scan of 1000 Daltons. Accordingly, if a quadrupole rod set mass filter or mass analyser is provided downstream of a preferred mass analyser, then the preferred mass analyser may be operated with a cycle time of the order of hundreds of milliseconds (rather than tens of milliseconds) so that the operation of the preferred mass analyser and the quadrupole rod set mass analyser can preferably be synchronised.

According to an embodiment a mass spectrometer may be provided which preferably comprises means for receiving and storing ions, means for releasing ions in a pulse, a preferred mass analyser which receives a pulse of ions and separates the ions according to their mass to charge ratio, a quadrupole rod set mass filter arranged downstream of the preferred mass analyser and an ion detector. According to an embodiment the mass spectrometer may comprise a first quadrupole rod set mass filter or analyser, means for receiving, fragmenting, storing and releasing ions in a pulse, a preferred mass analyser which receives a pulse of ions, a second quadrupole rod set mass filter or analyser arranged downstream of the preferred mass analyser and a means for detecting ions.

In a mode of operation ions may be received by and fragmented within a gas collision cell. The collision cell may be maintained at a pressure between $10^{-4}$ mbar and 1 mbar or more preferably between $10^{-3}$ and $10^{-1}$ mbar. The collision cell preferably comprises an RF ion guide. Ions are preferably arranged to be confined close to the central axis of the gas collision cell even when the ions undergo collisions with background gas molecules. The gas collision cell may comprise a multipole rod set ion guide wherein an AC or RF voltage is applied between neighbouring rods such that ions are radially confined within the collision cell.

According to another embodiment the gas collision cell may comprise a ring stack or ion tunnel ion guide comprising a plurality of electrodes having apertures through which ions are transmitted in use. Opposite phases of an AC or RF voltage are preferably applied between neighbouring or adjacent rings or electrodes so that ions are preferably radially confined within the gas collision cell by the generation of a radial pseudo-potential well.

According to a less preferred embodiment the collision cell may comprise another type of RF ion guide.

Ions in a mode of operation may preferably be caused to enter the collision cell with an energy of: at least 10 eV. The ions may undergo multiple collisions with gas molecules within the collision cell and may be induced to fragment.

The gas collision cell may be used to store ions and release ions in pulses in a mode of operation. A plate or electrode may be arranged at the exit of the collision cell and may be maintained at a potential such that a potential barrier is created which substantially prevents ions from exiting the collision cell. For positive ions, a potential of about +10 V with respect to the other electrodes of the collision cell may be maintained in order to trap ions within the collision cell. A similar plate or electrode may be provided at the entrance to the collision cell and may be maintained at a similar potential in order to prevent ions from exiting the collision cell via the entrance of the collision cell. If the potential on the plate or electrode at the entrance and/or the exit of the collision cell is momentarily lowered to 0 V, or less than 0 V, with respect to the other electrodes forming the collision cell, then ions will preferably be released from the collision cell in a pulse. The ions may then be onwardly transmitted from the collision cell to the preferred mass analyser.

According to an embodiment the amplitude of one or more transient DC potentials or voltages or DC potential or voltage waveforms applied to the electrodes of the preferred mass analyser is preferably progressively increased with time from a relatively low amplitude to a relatively high amplitude in synchronism with the operation of a quadrupole rod set mass filter or mass analyser arranged downstream of the preferred mass analyser. The quadrupole rod set mass filter may be arranged to be scanned or stepped down in mass or mass to charge ratio in synchronism with the cycle time of the preferred mass analyser.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
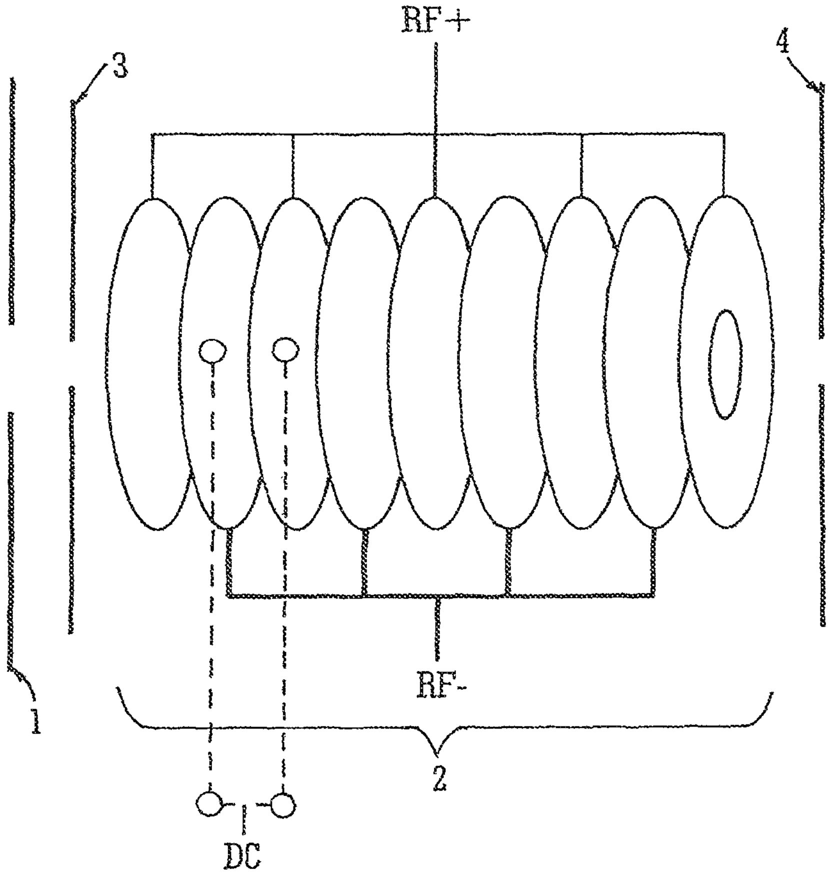
FIG. 1 shows a mass analyser according to a preferred embodiment of the present invention.

A mass analyser according to an embodiment of the present invention will now be described with reference to FIG. 1. The mass analyser preferably comprises an ion guide 2 comprising a plurality of ring electrodes having apertures through which ions are transmitted in use. Although not shown in FIG. 1, the electrodes are preferably arranged into groups wherein each group comprises a plurality of electrodes. All the electrodes in a group are preferably connected to the same phase of a first AC or RF voltage. Neighbouring or adjacent groups are preferably connected to opposite phases of the first AC or RF voltage. In addition, adjacent electrodes are preferably connected to opposite phases of a second AC or RF voltage supply. An entrance electrode 3 is preferably provided at the entrance to the ion guide 2 and an exit electrode 4 is preferably provided at the exit of the ion guide 2. A gate electrode 1 may optionally be provided upstream of the entrance electrode 3. The entrance electrode 3 and the gate electrode 1 may according to one embodiment comprise the same component.

Ions are preferably periodically pulsed into the ion guide 2 by, for example, momentarily lowering the potential of the gate electrode 1. Ions entering the ion guide 2 preferably experience an RF inhomogeneous field that serves to confine ions radially within the ion guide 2 due to the creation of a radial pseudo-potential well. Advantageously, the preferred mass analyser is preferably maintained at an intermediate pressure.

According to the preferred embodiment one or more transient DC voltages or potentials or DC voltage or potential waveforms are preferably applied to the electrodes comprising the ion guide 2. FIG. 1 shows a transient DC voltage being applied simultaneously to two electrodes of the ion guide 2 at a particular instance in time. One or more transient DC voltages or potentials or DC voltage or potential waveforms are preferably applied progressively to electrodes along the length of the ion guide 2. The one or more transient DC voltages or potentials or DC voltage or potential waveforms are preferably applied to the electrodes forming the ion guide 2 in such a way that a transient DC voltage or potential is only applied to any particular electrode for a relatively short period of time. The one or more transient DC voltages or potentials or DC voltage or potential waveforms are then preferably switched or applied to one or more adjacent electrodes.

The progressive application of one or more transient DC voltages or potentials or DC voltage or potential waveforms to the electrodes preferably causes one or more transient DC potential hills or real potential hills to be translated along the length of the ion guide 2. This preferably causes at least some ions to be urged or propelled along the length of the ion guide 2 in the same direction that the one or more transient DC voltages or potential or DC voltage or potential waveforms are progressively applied to the electrodes.

The second AC or RF voltage is preferably constantly applied to the electrodes. Adjacent electrodes along the axis of the ion guide are preferably maintained at opposite phases of the second AC or RF voltage supply. This preferably causes ions to be confined radially within the mass analyser 2 due to the creation of a radial pseudo-potential well. In addition, the application of the first AC or RF voltage supply to the plurality of electrodes along the length of the ion guide 2 preferably causes a plurality of time averaged axial pseudo-potential corrugations or potential hills, barriers or valleys to be formed or created along the axial length of the ion guide 2.

Figure 2:
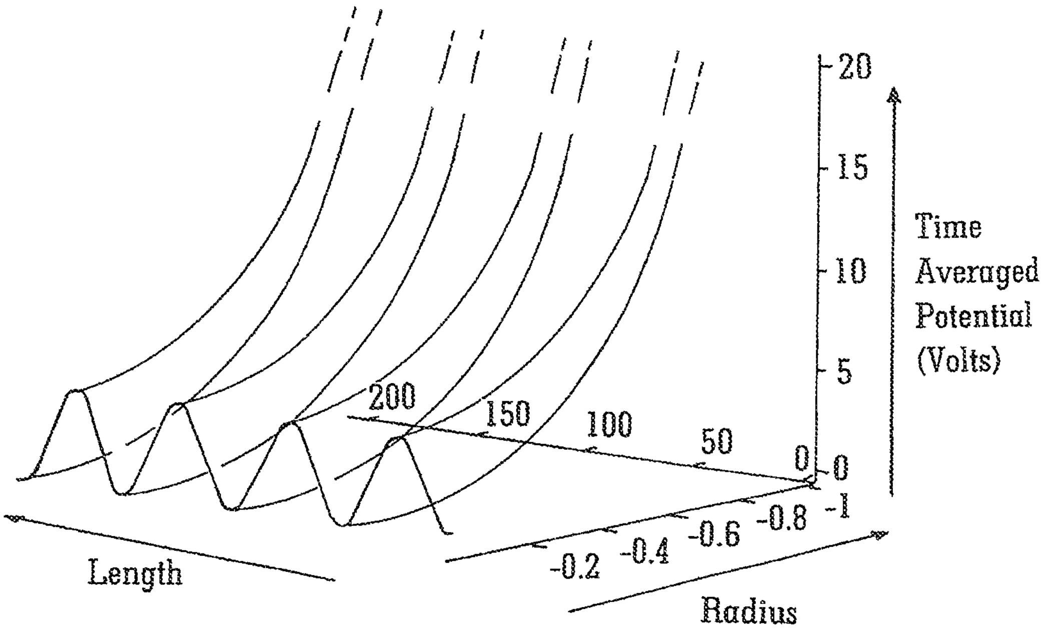
FIG. 2 shows the amplitude or depth of axial pseudo-potential corrugations along the length of a preferred mass analyser for ions having a mass to charge ratio of 100.

FIG. 2 shows the amplitude or depth of axial pseudo-potential corrugations or hills or pseudo-potential barriers which are experienced by ions having a relatively low mass to charge ratio of 100 within a mass analyser comprising a ring stack or ion tunnel ion guide 2 as shown in FIG. 1. The electrodes of the ion guide 2 were modelled as being connected to a single RF voltage source having a frequency of 2.70 Hz and a peak to peak voltage of 400 V. The centre to centre spacing of the ring electrodes was modelled as being 1.5 ml and the internal diameter of the ring electrodes was modelled as being 3 mm.

Figure 3:
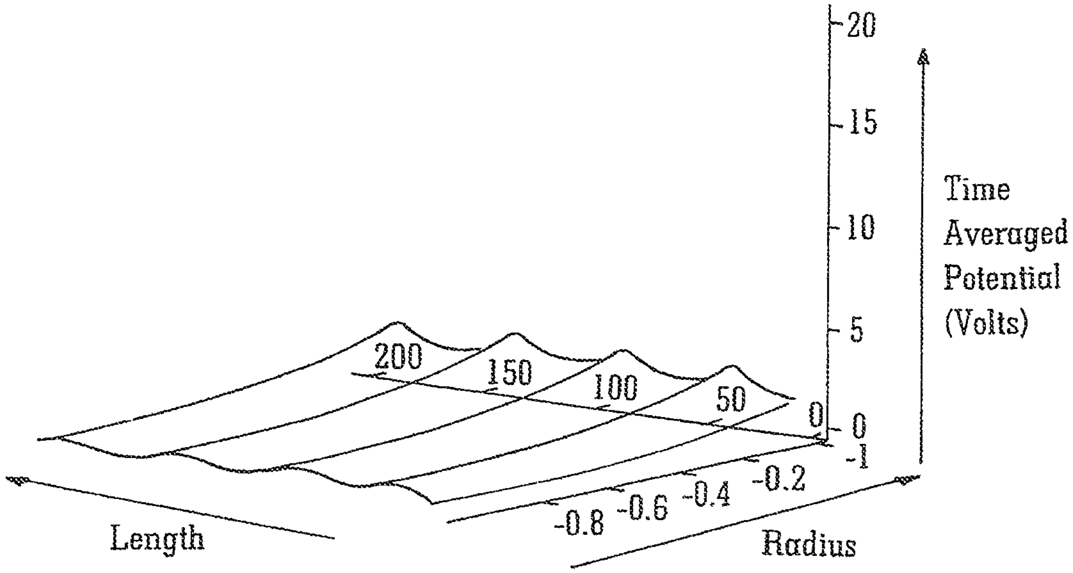
FIG. 3 shows the amplitude or depth of axial pseudo-potential corrugations along the length of a preferred mass analyser for ions having a mass to charge ratio of 1000.

FIG. 3 shows the reduced amplitude or depth axial pseudo-potential corrugations or hills or pseudo-potential barriers experienced by ions having a relatively high mass to charge ratio of 1000 within a mass analyser comprising a ring stack or ion tunnel ion guide 2 as shown in FIG. 1. The electrodes of the ion guide 2 were modelled as being connected to a single RF voltage source having a frequency of 2.7 MHz and a peak to peak voltage of 400 V. The centre to centre spacing of the ring electrodes was modelled as being 1.5 mm and the internal diameter of the ring electrodes was modelled as being 3 mm.

The minima of the time averaged or axial pseudo-potential corrugations or pseudo-potential barriers shown in FIGS. 2 and 3 correspond with the axial position or displacement of the ring electrodes. It is apparent from FIGS. 2 and 3 that the amplitude or depth of the axial pseudo-potential corrugations or pseudo-potential barriers is inversely proportional to the mass to charge ratio of the ions. For example, the amplitude of the axial pseudo-potential corrugations experienced by ions having a relatively low mass to charge ratio of 100 is approximately 5 V (as shown in FIG. 2) whereas the amplitude of the axial pseudo-potential corrugations experienced by ions having a relatively high mass to charge ratio of 1000 is only approximately 0.5 V (as shown in FIG. 3).

The effective depth, height or amplitude of the axial pseudo-potential corrugations or pseudo-potential barriers depends upon the mass to charge ratio of the ions. As a result, when ions are driven, forced or propelled along the length of the ion guide 2, then ions having a relatively high mass to charge ratio of 1000 will preferably experience less axial resistance (since the amplitude, height or depth of the axial pseudo-potential corrugations is relatively low for ions having relatively high mass to charge ratios) compared with ions having a relatively low mass to charge ratio of 100 (since the amplitude, height or depth of the axial pseudo-potential corrugations is relatively high for ions having relatively low mass to charge ratios).

Ions are preferably urged along the length of the ion guide 2 by one or more transient DC voltages or potentials or DC voltage or potential waveforms which are preferably progressively applied to the electrodes of the ion guide 2. According to the preferred embodiment the amplitude of the one or more transient DC voltages or potentials or DC voltage or potential waveforms applied to the electrodes is preferably progressively increased over a cycle of operation of the mass analyser so that ions having increasingly lower mass to charge ratios will begin to overcome the axial pseudo-potential corrugations and hence will be urged or driven along the length of the ion guide 2 and will ultimately be ejected from the exit of the ion guide 2.

Figure 4:
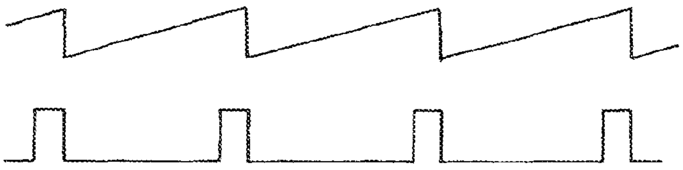
FIG. 4 shows an embodiment of the present invention wherein a preferred mass analyser is coupled to an orthogonal acceleration Time of Flight mass analyser via a transfer lens.
Figure 4:
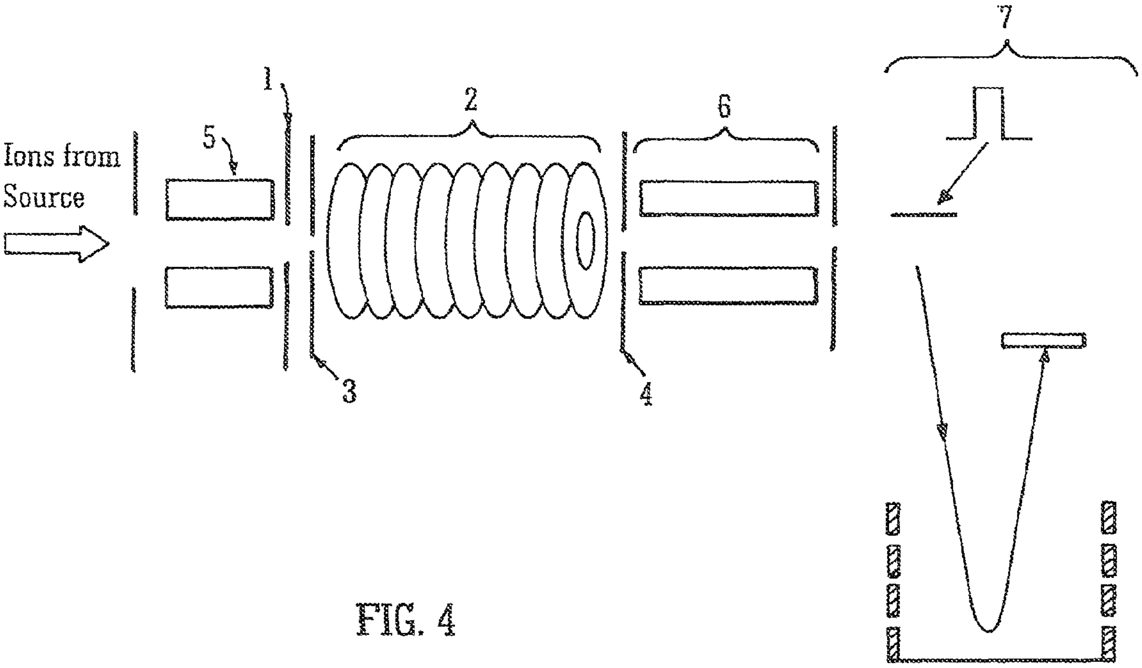

FIG. 4 shows an embodiment of the present invention wherein a preferred mass analyser 2 is coupled to an orthogonal acceleration Time of Flight mass analyser 7 via a transfer lens 6. Ions from an ion source (not shown) are preferably accumulated in an ion trap 5 arranged upstream of the preferred mass analyser 2. Ions are then preferably periodically released from the ion trap 5 by pulsing a gate electrode 1 arranged at the exit of the ion trap 5. At the moment that ions are released from the ion trap 5 the amplitude of one or more transient DC potentials or voltages or DC potential or voltage waveforms which is preferably applied to the electrodes of the ion guide 2 is preferably set at a minimum value, further preferably 0 V. The amplitude of the one or more transient DC potentials or voltages or DC potential or voltage waveforms applied to the electrodes of the mass analyser 2 is then preferably ramped or increased linearly from 0 V or a minimum value to a final maximum value or voltage over the cycle time of the preferred mass analyser 2. The cycle time of the preferred mass analyser 2 may, for example, be in the range 10 ms-1 s. During the cycle time of the preferred mass analyser 2, ions preferably emerge from the preferred mass analyser 2 in reverse order of their mass to charge ratio. Ions exiting the mass analyser 2 preferably pass through the transfer lens 6 and are then preferably onwardly transmitted to a vacuum chamber housing an orthogonal acceleration Time of Flight mass analyser 7. The ions are preferably mass analysed by the orthogonal acceleration Time of Flight mass analyser 7.

FIG. 4 also shows how the amplitude of the one or more transient DC voltages or potentials or DC potential or voltage waveforms applied to the electrodes of the preferred mass analyser 2 preferably increases linearly over three consecutive cycles of operation of the mass analyser. The corresponding voltage pulses applied, to the gate electrode 1 in order to pulse ions into the preferred mass analyser 2 are also shown.

An experiment was conducted no demonstrate the effectiveness of the mass analyser 2. A mixture of Leucine Enkephalin (M+==556) and Sulfadimethoxine (M+=311) was infused into a mass spectrometer arranged substantially as shown in FIG. 4. Ions were arranged to be pulsed from an ion trap 5 into an ion guide 2 of a preferred mass analyser 2 during a 800 μs gate pulse. The period between gate pulses and hence the cycle time of the preferred mass analyser 2 was set at 100 ms. The amplitude of one or more transient DC potentials or voltages or DC potential or voltage waveforms applied to the electrodes of the ion guide 2 was linearly ramped or increased from 0 V to 2 V over the 100 ms cycle time between gate pulses.

Figure 5:
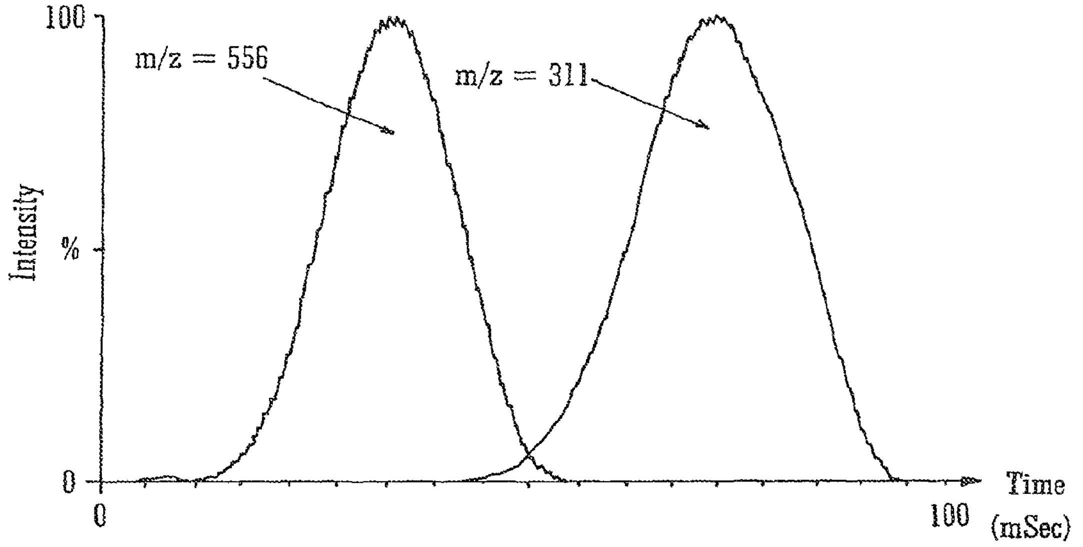
FIG. 5 shows a mass chromatogram of ions having mass to charge ratios of 311 and 556 when a mass analyser was operated with a cycle of time of 100 ms.

FIG. 5 shows a resulting reconstructed mass chromatogram for ions having mass to charge ratios of 311 and 556. The mass chromatogram was reconstructed from Time of Flight data acquired over the 100 ms cycle time of the mass analyser 2. The reconstructed mass chromatogram shows that ions having a mass to charge ratio of 311 took longer to traverse the length of the preferred mass analyser 2 than ions having a mass to charge ratio of 556.

Figure 6:
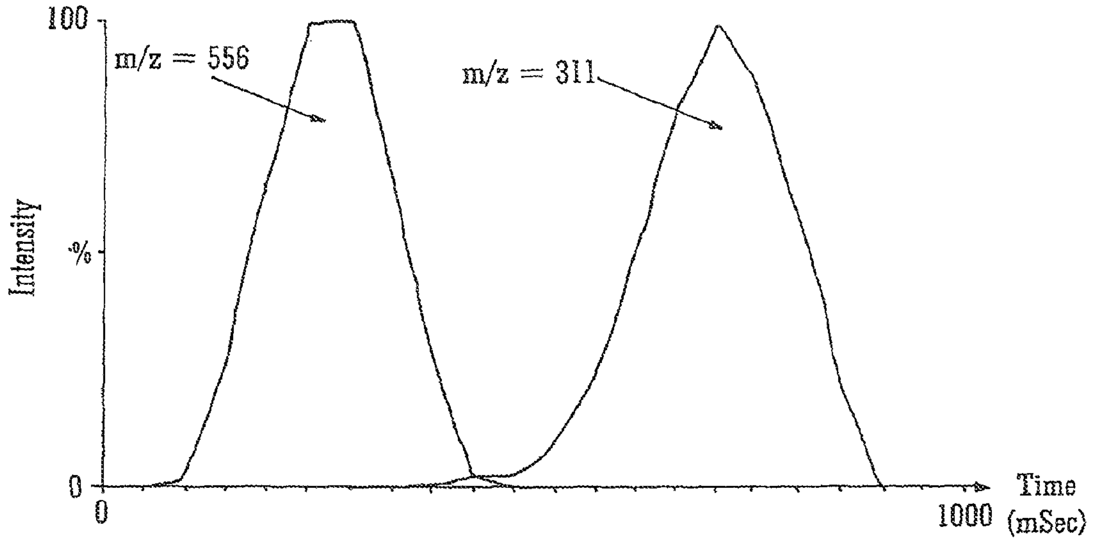
FIG. 6 shows a mass chromatogram of ions having mass to charge ratios of 311 and 556 when a mass analyser was operated with a cycle time of 1 second.

The experiment was then repeated but the width of the gate pulse was increased from 800 μs to 8 ms. The time between gate pulses and hence the cycle time of the preferred mass analyser 2 was also increased from 100 ms to 1 s. FIG. 6 shows the resulting reconstructed mass chromatogram for ions having mass to charge ratios of 311 and 556. The mass chromatograms were reconstructed from Time of Flight data acquired, over the 1 s cycle time of the mass analyser 2. The reconstructed mass chromatogram again showed that ions having a mass to charge ratio of 311 took longer to traverse the length of the preferred mass analyser 2 than ions having a mass to charge ratio of 556.

Figure 7:
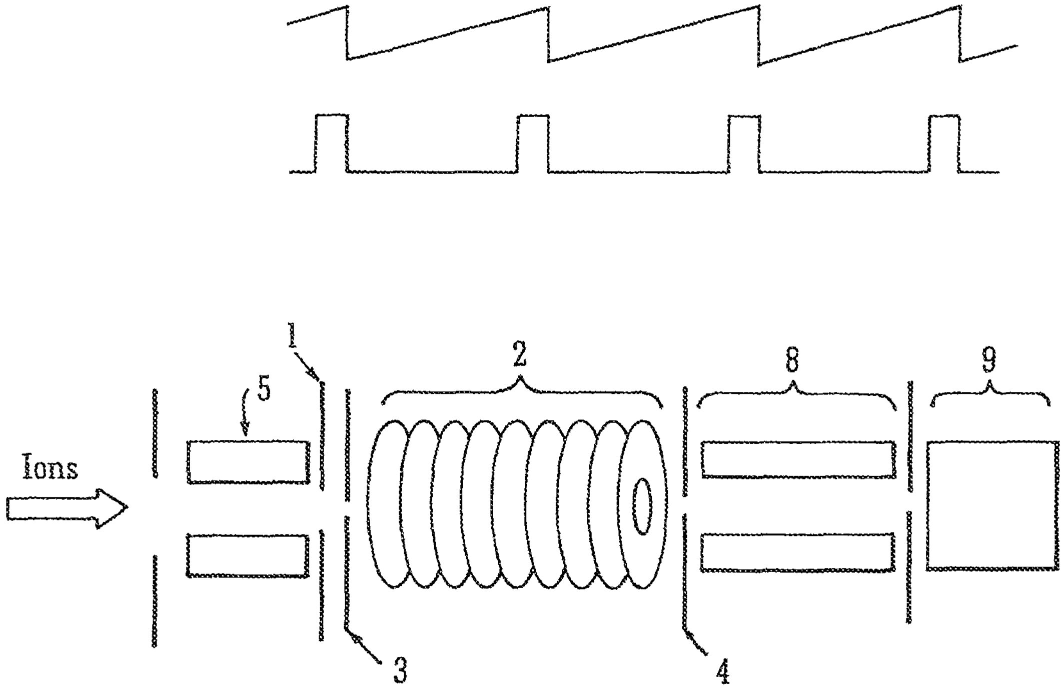
FIG. 7 shows another embodiment wherein a preferred mass analyser is coupled to a scanning quadrupole rod set mass filter or mass analyser.

According to some embodiments the preferred mass analyser 2 may have an intermediate mass to charge ratio resolution. However, the preferred mass analyser 2 may be coupled to a relatively high resolution scanning/stepping mass analyser such as a quadrupole rod set mass analyser 8 which is preferably arranged downstream of the preferred mass analyser 2. FIG. 7 shows an embodiment wherein a preferred mass analyser 2 is provided upstream of a quadrupole rod set mass analyser 8. An ion detector 9 is preferably provided downstream of the quadrupole rod set mass analyser 8. The mass to charge ratio transmission window of the quadrupole rod set mass analyser 8 is preferably scanned in use in synchronism with the expected mass to charge ratios of ions emerging from the preferred mass analyser 2. Coupling the preferred mass analyser 2 to a quadrupole mass analyser 8 arranged downstream preferably improves the overall instrument duty cycle and sensitivity of the mass spectrometer.

The output of the preferred mass analyser 2 is preferably a function of the mass to charge ratio of ions with time. At any given time the mass to charge ratio range of ions exiting the preferred mass analyser 2 will preferably be relatively narrow. Accordingly, ions having a particular mass to charge ratio will preferably exit the mass analyser 2 over a relatively short period of time. The mass to charge ratio transmission window of the scanning quadrupole rod set mass analyser 8 can therefore be synchronised with the expected mass to charge ratio range of ions exiting the preferred mass analyser 2 at any point in time such that the duty cycle of the scanning quadrupole rod set mass analyser 8 is preferably increased.

FIG. 7 also shows how the amplitude of the one or more transient DC voltages or potentials or DC potential or voltage waveforms applied to the electrodes of the preferred mass analyser 2 preferably increases linearly over three consecutive cycles of operation of the mass analyser. The corresponding voltage pulses applied to the gate electrode 1 in order to pulse ions into the preferred mass analyser 2 are also shown.

According to an alternative embodiment the mass to charge ratio transmission window of the quadrupole rod set mass analyser 8 may be increased in a stepped manner rather than in a linear manner. The mass to charge ratio transmission window of the quadrupole rod set mass analyser 8 may be stepped with or to a limited number of pre-determined values in a substantially synchronised manner with the release of ions exiting the preferred mass analyser 2. This enables the transmission efficiency and duty cycle of the quadrupole rod set mass filter 8 to be increased in a mode of operation wherein only certain specific ions having certain mass to charge ratios are of interest and are desired to be measured, detected or analysed.

Figure 8:
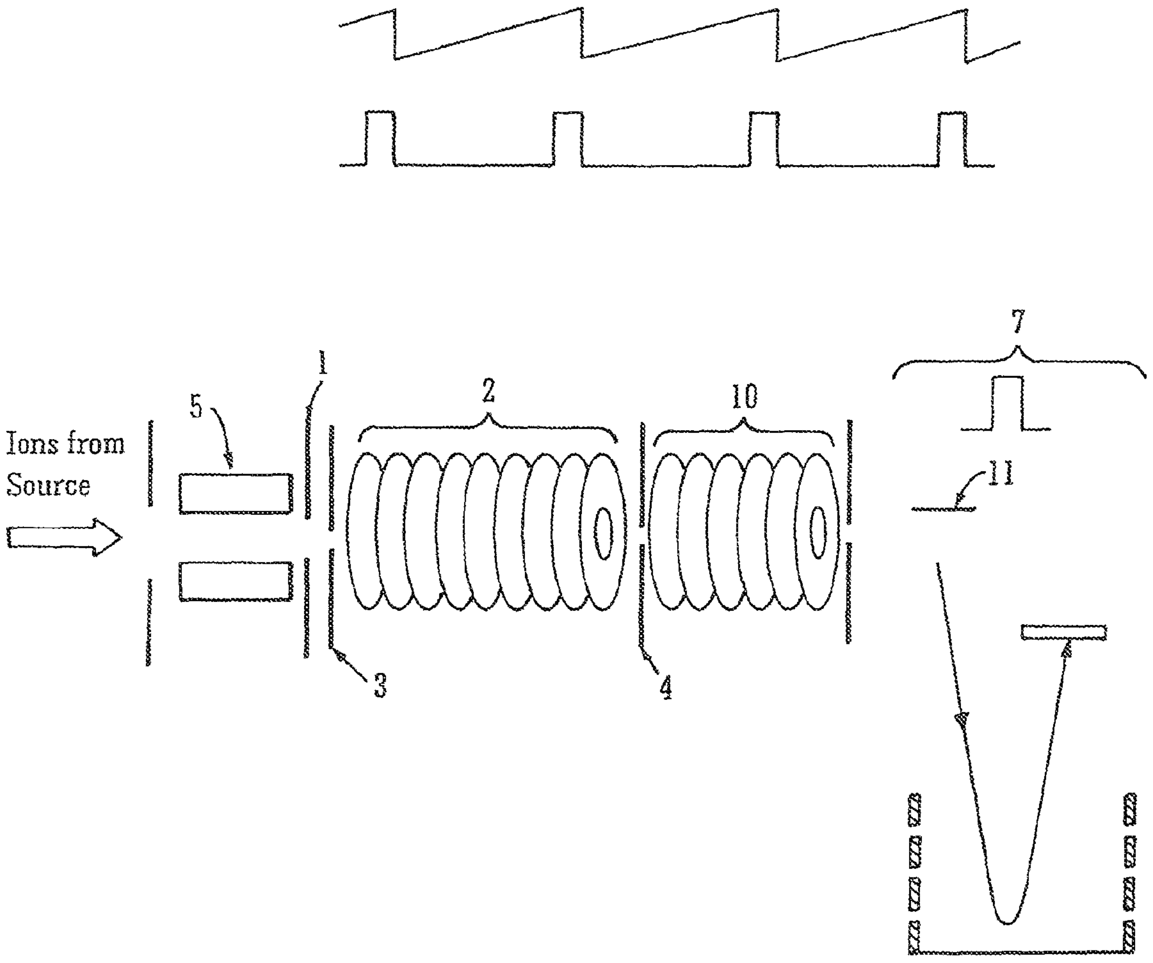
FIG. 8 shows another embodiment wherein a preferred mass analyser is coupled to an orthogonal acceleration Time of Flight mass analyser via an ion tunnel ion guide.

Another embodiment of the present invention is shown in FIG. 8 wherein a preferred mass analyser 2 is coupled to an orthogonal acceleration Time of Flight mass analyser 7 via an ion guide 10. According to this embodiment a mass spectrometer is preferably provided having an improved overall duty cycle and sensitivity. The ion guide 10 preferably comprises a plurality of electrodes each having an aperture. One or more transient DC potentials or voltages or DC potential voltage waveforms are preferably applied to the electrodes of the ion guide 10 in order to urge or translate ions along the length of the ion guide 10. The ion guide 10 is preferably arranged to effectively sample the ions emerging from the preferred mass analyser 2. As a result, ions having a relatively narrow range of mass to charge ratios which emerge as a packet from the preferred mass analyser 2 at any instance in time are preferably arranged to be trapped in one of a plurality of real axial potential wells which are preferably formed or created within the ion guide 10. The real axial potential wells which are preferably formed or created within the ion guide 10 are preferably continuously translated along the length of the ion guide 10. Packets of ions are preferably trapped in discrete potential wells in the ion guide 10 such that ions in one potential well preferably do not pass to an adjacent potential well.

The axial potential wells formed or created in the ion guide 10 are preferably continually translated along the length of the ion guide 10. As an axial potential well reaches the downstream end of the ion guide 10, then the packet of ions contained within that axial potential well is preferably released and the packet of ions is preferably onwardly transmitted to the orthogonal acceleration Time of Flight mass analyser 7. An orthogonal acceleration extraction pulse is preferably applied to an extraction electrode 11 of the orthogonal acceleration Time of Flight mass analyser 7. The orthogonal acceleration extraction pulse is preferably synchronised with the release of a packet of ions from the ion guide 10 in order to maximise the sampling efficiency of the packet of ions into the drift or time of flight region of the orthogonal acceleration Time of Flight mass analyser 7.

FIG. 8 also shows how the amplitude of the one or more transient DC voltages or potentials or DC potential or voltage waveforms applied to the electrodes of the preferred mass analyser 2 preferably increases linearly over three consecutive cycles of operation of the mass analyser. The corresponding voltage pulses applied to the gate electrode 1 in order to pulse ions into the preferred mass analyser 2 are also shown.

Various further embodiments are contemplated. According to an embodiment the mass analyser 2 may comprise ring electrodes having a rectangular, square or elliptical apertures. According to another embodiment the mass analyser 2 may comprise a segmented multipole rod set ion guide.

According to an embodiment ions may be pulsed directly from the ion source into the preferred mass analyser 2. For example, a MALDI ion source or another pulsed ion source may be provided and ions may be pulsed into the preferred mass analyser 2 each time a laser beam is fired at a target plate of the ion source.

According to an embodiment a collision, fragmentation or reaction cell may be provided upstream and/or downstream of the preferred mass analyser 2. According to an embodiment the potential difference between the preferred mass analyser 2 and the collision, fragmentation or reaction cell may be progressively ramped down or decreased over the cycle time of the preferred mass analyser 2 and as the amplitude of the one or more transient DC potentials or voltages or DC voltage or potential waveforms applied to the electrodes of the ion guide 2 of the preferred mass analyser is preferably progressively ramped up or increased. According to this embodiment the energy of the ions exiting the preferred mass analyser 2 is preferably optimised for subsequent fragmentation in the collision, fragmentation or reaction cell provided downstream of the mass analyser 2.

Although the present invention has been described with reference to preferred embodiments, it will be understood by those skilled in the art that various chances in form and detail may be made without departing from the scope of the invention as set forth in the accompanying claims.

The invention claimed is:

1. A mass analyzer comprising:

an ion guide including a plurality of electrodes;

a first voltage source for applying a first RF voltage having a first frequency and a first amplitude to form a barrier at an entrance or an exit of said ion guide;

a second voltage source for forming a second voltage confining ions radially in use within said ion guide; and a third voltage source for forming an electric field, voltage, or waveform for driving ions towards the ion guide or through at least a portion of an axial length of said ion guide so that in a mode of operation ions having mass to charge ratios within a first range exit said ion guide while ions having mass to charge ratios within a second range, which is different from the first range, do not exit said ion guide.

2. The mass analyzer as claimed in claim 1, wherein the second voltage is an RF voltage having a second frequency and a second amplitude and is applied to one or more electrodes of the plurality of electrodes, and wherein said first frequency is substantially different from said second frequency or said first amplitude is substantially different from said second amplitude.

3. The mass analyzer as claimed in claim 2, wherein axially adjacent electrodes of the plurality of electrodes are supplied with opposite phases of said second RF voltage.

4. The mass analyzer as claimed in claim 1, wherein said plurality of electrodes comprises a plurality of electrodes having apertures through which ions are transmitted in use.

5. The mass analyzer as claimed in claim 1, wherein the third voltage source comprises means for generating an axial DC electric field along at least a portion of said ion guide.

6. The mass analyzer as claimed in claim 1, wherein the third voltage source comprises means for applying a multiphase RF voltage to at least some of said electrodes.

7. The mass analyzer as claimed in claim 1, wherein the third voltage source comprises means for applying one or more transient DC voltages or one or more DC voltage waveforms to at least some of said electrodes.

8. The mass analyzer as claimed in claim 7, wherein in use a plurality of axial DC potential hills, barriers or wells are translated along the length of said ion guide or a plurality of transient DC voltages are progressively applied to electrodes along the axial length of said ion guide.

9. The mass analyzer as claimed in claim 7, further comprising means arranged and adapted to vary the amplitude, height or depth of said one or more transient DC voltages or said one or more DC voltage waveforms.

10. The mass analyzer as claimed in claim 7, further comprising means arranged and adapted to vary a velocity or rate at which said one or more transient DC voltages or said one or more DC voltage waveforms are applied to said electrodes.

11. The mass analyzer as claimed in claim 2, further comprising means arranged and adapted to vary the amplitude or frequency of said first or second RF voltage applied to said electrodes.

12. The mass analyzer as claimed in claim 1, wherein in a mode of operation ions are arranged to be trapped but are not substantially fragmented within said ion guide.

13. The mass analyzer as claimed in claim 1, wherein the barrier is an RF barrier formed at the exit to said ion guide.

14. A mass analyzer comprising:

an ion guide, wherein two RF voltages having different amplitudes or frequencies or phases are applied in use to said ion guide such that a potential barrier is formed in said ion guide; and means for driving ions towards said ion guide or through at least a portion of an axial length of said ion guide so that in a mode of operation ions having mass to charge ratios within a first range exit said ion guide while ions having mass to charge ratios within a second range, which is different from said first range, do not exit said ion guide due to said barrier.

15. The mass analyzer as claimed in claim 14, wherein the barrier is an RF barrier formed at the entrance or exit of said ion guide.

16. A method of mass analyzing ions with an ion guide including a plurality of electrodes comprising:

creating a potential barrier at an entrance or an exit of said ion guide;

confining ions radially within said ion guide; and driving ions towards said ion guide or through at least a portion of an axial length of said ion guide so that in a mode of operation ions having mass to charge ratios within a first range exit said ion guide whilst ions having mass to charge ratios within a second range, which is different from said first range, do not exit said ion guide due to said barrier.

17. The method of mass analyzing ions with an ion guide as claimed in claim 16, wherein the barrier is created at the exit of the ion guide.

* * * * *